US012701638B2

(12) United States Patent
Nayak et al.

(10) Patent No.: US 12,701,638 B2
(45) Date of Patent: Aug. 4, 2026

(54) METHODS AND APPARATUS FOR ASSISTED EMERGENCY PREPAREDNESS COMMUNICATION SERVICES (EPCS)

(71) Applicant: Samsung Electronics Co., Ltd., Suwon-si (KR)

(72) Inventors: Peshal Nayak, Plano, TX (US); Boon Loong Ng, Plano, TX (US); Rubayet Shafin, Allen, TX (US); Vishnu Vardhan Ratnam, Plano, TX (US); Yue Qi, Plano, TX (US); Elliot Jen, Taipei City (TW)

(73) Assignee: Samsung Electronics Co., Ltd., Suwon-si (KR)

( * ) Notice: Subject to any disclaimer, the term of this patent is extended or adjusted under 35 U.S.C. 154(b) by 328 days.

(21) Appl. No.: 18/480,404

(22) Filed: Oct. 3, 2023

(65) Prior Publication Data

US 2024/0244712 A1     Jul. 18, 2024

Related U.S. Application Data

(60) Provisional application No. 63/439,502, filed on Jan. 17, 2023.

(51) Int. Cl.
*H04W 76/50* (2018.01)
(52) U.S. Cl.
CPC .................................. *H04W 76/50* (2018.02)
(58) Field of Classification Search
CPC ........... H04W 4/90; H04W 4/02; H04W 4/06; H04W 4/22; H04W 4/60; H04W 64/00; G01S 5/02; H04L 29/06

USPC ................................................ 455/404.1, 442
See application file for complete search history.

(56) References Cited

U.S. PATENT DOCUMENTS

| | | | |
|---|---|---|---|
| 2013/0225181 A1 * | 8/2013 | Radulescu ............ | H04W 72/56 |
| | | | 455/442 |
| 2015/0111527 A1 | 4/2015 | Michaelis et al. | |
| 2016/0295386 A1 | 10/2016 | Faccin et al. | |
| 2018/0220269 A1 | 8/2018 | Katakam et al. | |
| 2019/0222470 A1 * | 7/2019 | Campos .................. | H04W 4/90 |
| 2021/0266891 A1 * | 8/2021 | Chu ....................... | H04L 5/1469 |
| 2022/0240264 A1 * | 7/2022 | Chu ....................... | H04W 12/06 |

(Continued)

FOREIGN PATENT DOCUMENTS

| | | |
|---|---|---|
| WO | 2016/018512 A1 | 2/2016 |
| WO | 2021/021560 A1 | 2/2021 |

OTHER PUBLICATIONS

John Wullert (Peraton Labs): "EPCS and Fast Transition", IEEE Draft; 11-22-2164-00-oooobe-epcs-and-fast-tranisition, IEEE—SA Mentor, Piscataway, NJ USA, (Year: 2023).*

(Continued)

*Primary Examiner* — Maria El-Zoobi

(57) ABSTRACT

A wireless communication network includes an assistance-seeking access point (AP) that needs assistance in providing emergency preparedness communication services (EPCS) operation. An assisting AP is EPCS enabled AP and provides support to the assistance-seeking AP. The assisting AP is coupled to a subscription service provider network (SSPN) interface, The assistance-seeking AP may search for an assisting AP in its vicinity. The assisting AP may be a mobile AP.

20 Claims, 22 Drawing Sheets

(56) References Cited

U.S. PATENT DOCUMENTS

2024/0063995 A1 \* 2/2024 Ajami ................... H04L 5/1469

OTHER PUBLICATIONS

IEEE P802.11be-D3.2 "Part 11: Wireless LAN Medium Access Control (MAC) and Physical Layer (PHY) Specifications—Amendment 8: Enhancements for extremely high throughput (EHT)" May 2023.

IEEE Std 802.11-2020 "Part 11: Wireless LAN Medium Access Control (MAC) and Physical Layer (PHY) Specifications" IEEE Standard for Information Technology—Telecommunications and Information Exchange between Systems Local and Metropolitan Area Networks—Specific Requirements. Dec. 3, 2020.

IEEE Std 802.11ax-2021 "Part 11: Wireless LAN Medium Access Control (MAC) and Physical Layer (PHY) Specifications—Amendment 1: Enhancements for High-Efficiency WLAN" Feb. 2021.

International Search Report & Written Opinion for PCT/KR2023/016036 by Korean Intellectual Property Office dated Jan. 26, 2023.

Extended European Search Report for EP 23917851.0 by European Patent Office dated Sep. 10, 2025.

Wullert, John et al., "Resolution of CIDs on EPCS and Fast Transition (LB266)", IEEE 802.11-22-2164r0, XP068195889, URL: https://mentor.ieee.org/802.11/dcn/22/11-22-2164-00-00be-epcs-and-fast-tranisition.docx, Jan. 2023.

Au, Edward et al., "Telecommunications and information exchange between systems Local and metropolitan area networks, Part 11: Wireless LAN Medium Access Control (MAC) and Physical Layer (PHY) Specifications, Amendment 8: Enhancements for extremely high throughput (EHT)", IEEE P802.11be/D1.5, XP068270477, URL: https://ieee-sa.imeetcentral.com/p/aQAAAAAE6uOb, Mar. 2022.

Wullert, John et al., "Resolution of CIDs in clauses 35.17.1 and 35.17.2 (LB 266)", IEEE 802.11-22-1179r0, XP068193063, URL: https://mentor.ieee.org/802.11/dcn/22/11-22-1179-00-00be-resolution-of-cids-in-clauses-35-17-1-and-35-17-2-lb-266.docx, Jul. 2022.

Wullert, John et al., "Resolution of EPCS-related CIDs in clause 4.5.13 (CC 266)", IEEE 802.11-22-1015r1, XP068192663, URL: https://mentor.ieee.org/802.11/dcn/22/11-22-1015-02-00be-resolution-of-epcs-related-cids-in-clause-4-5-13-cc-266.docx, Jul. 2022.

\* cited by examiner

| Information field | Description |
|---|---|
| Assistance-seeking AP MLD identifier | Information that may identify the assistance-seeking AP. For example, this may be the assistance-seeking AP MLD's Basic Service Set Identifier (BSSID). |
| Candidate AP MLD identifier | Information that may identify the AP MLD that may be considered as a candidate for assisting AP MLD, e.g., by the assistance-seeking AP MLD. For example, this may be the candidate AP MLD's BSSID. |
| Assistance duration | Duration for which the assistance is being requested by the assistance-seeking AP MLD. |
| Token | An identifier that may uniquely identify the current request sent by the assistance-seeking AP MLD to the candidate AP MLD. When the candidate AP MLD responds to the request, it may include the same token in the response so that the assistance-seeking AP MLD may understand which request the response corresponds to. For example, this may be an integer value. |
| Reason code | A code to identify the reason for making the request. For example, SSPN interface link lost. |
| Immediate support identifier | A field that may specify if the EPCS support will be needed immediately if response is affirmative or EPCS support may be requested in the future. For example, this may be a bit that may be set to 1 if immediate support is needed and to 0 to specify that the support may be needed in the future and the assistance-seeking AP MLD is currently checking for a potential assisting AP MLD for the future. |
| Future support timeout | A field that may specify the duration after which the current request may be considered as invalid. Thus, if the assistance-seeking AP MLD does not request for support within this duration, then the assistance-seeking AP MLD may make a new request. |
| SSPN interface identifier | A field that may identify the SSPN interface that the assistance-seeking AP MLD communicates with. |
| EPCS operation type | Type of EPCS operation that the assistance-seeking AP MLD may support. For example, service level EPCS operation, link level EPCS operation, MLD level EPCS operation, etc. This field may be an integer with a pre-determined value that may indicate which EPCS operation type may be supported by the assistance-seeking AP MLD. In some embodiments, this may be a bitmap in which the bit corresponding to the particular EPCS operation type supported by the assistance seeking AP MLD may be set to 1. |
| Services identifier | Services for which EPCS support may be requested by the assistance-seeking AP MLD. This field may be used if service level EPCS operation is supported by the assistance-seeking AP MLD. |
| Response timeout | Duration within which the assistance-seeking AP MLD may expect a response from the candidate AP (if candidate AP MLD agrees to be assisting AP MLD) to the authorization request(s) that the assistance-seeking AP MLD sends to the candidate AP MLD. If a candidate AP MLD cannot support this value, it may either reject the request or propose a value that it may support when providing assistance. |

| Information field | Description |
|---|---|
| Assistance-seeking AP MLD identifier | Information that may identify the assistance-seeking AP. For example, this may be the assistance-seeking AP MLD's BSSID. |
| Candidate AP MLD identifier | Information that may identify the AP MLD (responding AP MLD) that may be considered as a candidate for assisting AP MLD, e.g., by the assistance-seeking AP MLD. For example, this may be the candidate AP MLD's BSSID. |
| Assistance duration | Duration for which the assistance is being requested by the assistance-seeking AP MLD (responding AP MLD). |
| Token | An identifier that may uniquely identify the request made by the assistance-seeking AP MLD. This token value may be the same value that the assistance-seeking AP MLD included in the request sent to the candidate AP MLD to uniquely identify the request. For example, this may be an integer value. |
| Response nature | A field to indicate that the candidate AP MLD (responding AP MLD) accepts the request sent by the assistance seeking AP MLD. |
| Reason code | A code to explain the reason for the response. For example, if the response rejects the request because it is already providing assistance to another assistance seeking AP MLD and cannot support another assistance seeking AP MLD, a code may be used to indicate these details. |
| Immediate support identifier | A field that may specify if the EPCS support may be provided immediately or the assistance-seeking AP MLD may check again in the future. For example, this may be a bit that may be set to 1 if immediate support is available and to 0 to specify that the support is unavailable at the moment and the assistance-seeking AP MLD may check again in the future. |
| Future support timeout | A field that may specify the duration after which the current request may be considered as invalid. Thus, if the assistance-seeking AP MLD does not request for support within this duration, then the assistance-seeking AP MLD may make a new request. |
| EPCS operation type | Type of EPCS operation that the assistance-seeking AP MLD may support. For example, service level EPCS operation, link level EPCS operation, MLD level EPCS operation, etc. This field may be an integer with a pre-determined value that may indicate which EPCS operation type may be supported by the assistance-seeking AP MLD. In some embodiments, this may be a bitmap in which the bit corresponding to the particular EPCS operation type supported by the assistance seeking AP MLD may be set to 1. |
| Services identifier | Services for which EPCS support may be supported by the candidate AP MLD when providing assistance. |
| Response timeout | Duration proposed by the candidate AP MLD as the time within which a response may be expected from if the assistance-seeking AP MLD requests for support on EPCS operations authorization (e.g. EPCS priority access service authorization). |

| Information field | Description |
|---|---|
| Assistance-seeking AP MLD identifier | Information that may identify the assistance-seeking AP. For example, this may be the assistance seeking AP MLD's BSSID. |
| Candidate AP MLD identifier | Information that may identify the AP MLD (responding AP MLD) that may be considered as a candidate for assisting AP MLD by the assistance-seeking AP MLD. For example, this may be the candidate AP MLD's BSSID. |
| Token | An identifier that may uniquely identify the response with the EPCS termination by the assistance seeking AP MLD. |
| Reason code | A code to explain the reason for the termination. For example, if SSPN interface link is restored, then there may be a reason code to indicate this. |
| Response requested | A field to indicate if a response is requested by the assistance-seeking AP MLD from the assisting AP MLD that receives this frame. |

| Information field | Description |
|---|---|
| Assistance-seeking AP MLD identifier | Information that may identify the assistance-seeking AP. For instance, this may be the assistance-seeking AP MLD's BSSID. |
| Candidate AP MLD identifier | Information that may identify the AP MLD (responding AP MLD) that may be considered as a candidate for assisting AP MLD by the assistance-seeking AP MLD. For example, this may be the candidate AP MLD's BSSID. |
| Token | An identifier that may uniquely identify the response with the EPCS termination by the assistance-seeking AP MLD. |

| Information field | Description |
|---|---|
| Assistance-seeking AP MLD identifier | Information that may identify the assistance-seeking AP. For example, this may be the assistance-seeking AP MLD's BSSID. |
| Assisting AP MLD identifier | Information that may identify the assisting AP MLD. For example, this may be the candidate AP MLD's BSSID. |
| Token | An identifier that may uniquely identify the response with the authorization support request by the assistance-seeking AP MLD. The assisting AP MLD may include this token in the corresponding response. |
| Non-AP MLD count | The number of non-AP MLDs for which the authorization request is necessary. |
| Non-AP MLD identifier list | An identifier for each non-AP MLD for which the authorization request is necessary. For example, this may be a list of MAC addresses of the non-AP MLDs ordered in the same manner as the EPCS priority access enable request frame list below. |
| EPCS priority access enable request frame list | A list of EPCS priority access enable request frames received by the assisting AP MLD from the EPCS capable non-AP MLDs associated with it. In some embodiments, instead of providing the EPCS priority access enable request frame itself, the assistance-seeking AP MLD may provide one or more fields of the EPCS priority access enable request frame for each associated non-AP MLD that is requesting EPCS priority access service activation. |
| EPCS priority access status list | A list specifying the EPCS priority access enable status for each of the non-AP MLD(s) for which the above information is provided. The status may be ordered in the same manner in which the corresponding EPCS priority access enable request frames are ordered. |
| Request timeout | Duration within which the request needs to be processed and a response needs to be generated by the assisting AP MLD. |

| Information field | Description |
|---|---|
| Assistance-seeking AP MLD identifier | Information that may identify the assistance-seeking AP. For instance, this may be the assistance-seeking AP MLD's BSSID. |
| Assisting AP MLD identifier | Information that may identify the assisting AP MLD. For example, this may be the candidate AP MLD's BSSID. |
| Token | An identifier that may uniquely identify the response with the authorization support request by the assistance-seeking AP MLD. The assisting AP MLD may include this token in the corresponding response. |
| Non-AP MLD count | The number of non-AP MLDs for which the authorization request has been processed. |
| Non-AP MLD identifier list | An identifier for each non-AP MLD for which the authorization request has been processed. For example, this may be a list of MAC addresses of the non-AP MLDs ordered in the same manner as the EPCS priority access enable response frame list below. |
| EPCS priority access enable response frame list | A list of EPCS priority access enable response frames generated by the assisting AP MLD. In another embodiment, instead of providing the EPCS priority access enable response frame itself, the assisting AP MLD may provide one or more fields of the EPCS priority access enable response frame for each associated non-AP MLD that is requesting EPCS priority access service activation. |
| Reason code list | A list of reason code justifying the response for each non-AP MLD. For example, if for a particular non-AP MLD, the assisting AP MLD rejects the EPCS priority access enable request, it may use a reason code to make that indication. The reason code may be ordered in the same manner as the enable response frame list ordering. |

| Information field | Description |
|---|---|
| Assistance-seeking AP MLD identifier | Information that may identify the assistance-seeking AP. For example, this may be the assistance-seeking AP MLD's BSSID. |
| Assisting AP MLD identifier | Information that may identify the assisting AP MLD. For instance, this may be the candidate AP MLD's BSSID. |
| Token | An identifier that may uniquely identify the unsolicited frame transmitted by the assisting AP MLD. |
| Reason code | A reason code to explain why the frame has been generated. E.g., if assisting AP MLD performed a periodic check to verify if the EPCS priority access state of a non-AP MLD is still valid and found that it has been revoked, then a reason code may be used to indicate that the unsolicited frame is based on a periodic check made by the assisting AP MLD. |
| Non-AP MLD count | The number of non-AP MLDs for which information has been included in the frame. |
| Non-AP MLD identifier list | An identifier for each non-AP MLD for which information in the frame has been included. For example, this may be a list of MAC addresses of the non-AP MLDs ordered in the same manner as the EPCS priority access teardown frame list below. |
| EPCS priority access teardown frame list | A list of EPCS priority access teardown frames generated by the assisting AP MLD. In some embodiments, instead of providing the EPCS priority access teardown frame itself, the assisting AP MLD may provide one or more fields of the EPCS priority access teardown frame for each associated non-AP MLD. |
| Reason code list | A list of reason code justifying the update for each non-AP MLD. For example, status revoked by SSPN interface. The reason code may be ordered in the same manner as the teardown frame list ordering. |

| Information field | Description |
|---|---|
| Assistance-seeking AP MLD identifier | Information that may identify the assistance seeking AP. For instance, this may be the assistance seeking AP MLD's BSSID. |
| Assisting AP MLD identifier | Information that may identify the assisting AP MLD. For instance, this may be the candidate AP MLD's BSSID. |
| Token | An identifier that may uniquely identify the request frame transmitted by the assistance seeking AP MLD. |
| Parameter identifier list | Identifier for a parameter which the assistance seeking AP MLD shares with the assisting AP MLD. This may be a parameter that is necessary for the assisting AP MLD to know to provide operation parameter update support. E.g., non-EPCS non-AP MLD count, EPCS non-AP MLD count, etc. Further, there may be a value used to represent each parameter and the value may be determined by the operator or by the standard. E.g., value of 1 to indicate EPCS non-AP MLD count. |
| Parameter value list | The values corresponding to the parameters specified in the above list in the same order as in the above list. |

| Information field | Description |
|---|---|
| Assistance-seeking AP MLD identifier | Information that may identify the assistance-seeking AP. For instance, this may be the assistance-seeking AP MLD's BSSID. |
| Assisting AP MLD identifier | Information that may identify the assisting AP MLD. For instance, this may be the candidate AP MLD's BSSID. |
| Token | An identifier that may uniquely identify the request frame for which this response is being generated by the assisting AP MLD. |
| Non-AP MLD count | The number of non-AP MLDs for which information has been included in the frame. |
| Non-AP MLD identifier list | An identifier for each non-AP MLD for which information in the frame has been included. For example, this may be a list of MAC addresses of the non-AP MLDs ordered in the same manner as the EPCS operation parameter list below. |
| EPCS operation parameter list | EPCS operation parameters for each EPCS enabled non-AP MLD. For example, this may be the enhanced EDCA parameter set for each EPCS enabled non-AP MLD. |

| Information field | Description |
|---|---|
| Assistance-seeking AP MLD identifier | Information that may identify the assistance seeking AP. For example, this may be the assistance-seeking AP MLD's BSSID. |
| Assisting AP MLD identifier | Information that may identify the assisting AP MLD. For example, this may be the candidate AP MLD's BSSID. |
| Token | An identifier that may uniquely identify the EPCS service termination frame. |
| Non-AP MLD count | The number of non-AP MLDs for which information has been included in the frame. |
| Non-AP MLD identifier list | An identifier for each non-AP MLD for which EPCS service has been terminated. For example, this may be a list of MAC addresses of the non-AP MLDs. |

METHODS AND APPARATUS FOR ASSISTED EMERGENCY PREPAREDNESS COMMUNICATION SERVICES (EPCS)

CROSS-REFERENCE TO RELATED APPLICATIONS

This application claims the benefit of priority from U.S. Provisional Application No. 63/439,502, entitled "METHODS AND APPARATUS FOR ASSISTED EPCS PRIORITY ACCESS SUPPORT AND OPERATION", filed Jan. 17, 2023, which is incorporated herein by reference in its entirety.

TECHNICAL FIELD

This disclosure relates generally to wireless communication, and more particularly to, for example, but not limited to, assistance for Emergency Preparedness Communication Services (EPCS) procedures in a wireless communication system.

BACKGROUND

Wireless local area network (WLAN) technology has evolved toward increasing data rates and continues its growth in various markets such as home, enterprise and hotspots over the years since the late 1990s. WLAN allows devices to access the internet in the 2.4 GHz, 5 GHz, 6 GHz or 60 GHz frequency bands. WLANs are based on the Institute of Electrical and Electronic Engineers (IEEE) 802.11 standards. IEEE 802.11 family of standards aims to increase speed and reliability and to extend the operating range of wireless networks.

WLAN devices are increasingly required to support a variety of delay-sensitive applications or real-time applications such as augmented reality (AR), robotics, artificial intelligence (AI), cloud computing, and unmanned vehicles. To implement extremely low latency and extremely high throughput required by such applications, multi-link operation (MLO) has been suggested for the WLAN. The WLAN is formed within a limited area such as a home, school, apartment, or office building by WLAN devices. Each WLAN device may have one or more stations (STAs) such as the access point (AP) STA and the non-access-point (non-AP) STA.

The MLO may enable a non-AP multi-link device (MLD) to set up multiple links with an AP MLD. Each of multiple links may enable channel access and frame exchanges between the non-AP MLD and the AP MLD independently, which may reduce latency and increase throughput.

In recent times there has been a growing need for Emergency telecommunication services over WLAN networks. Emergency preparedness communication services (EPCS) have been introduced with the goal of providing prioritized access to certain authorized users.

The description set forth in the background section should not be assumed to be prior art merely because it is set forth in the background section. The background section may describe aspects or embodiments of the present disclosure.

SUMMARY

One embodiment of the present disclosure may provide an access point (AP) device in a wireless network. The AP device may comprise one or more APs, and a processor coupled to the one or more APs. The processor may be configured to: determine a need for assistance for support for emergency communication priority access service; based on the determination that the assistance for support for emergency communication priority access service is needed, determine that at least one external AP device is available to provide the assistance for support of emergency communication priority access service; transmit a request frame to the at least one external AP device to request assistance for support for emergency communication priority access services; receive a response from the at least one external AP device; and based on the response from the at least one external AP device, provide, with the assistance from the at least one external AP device, support of emergency communication priority access service to a non-AP device associated with the AP device.

In some embodiments, the processor may be configured to receive an advertisement from the at least one external AP device advertising a capability to provide support for emergency communication priority access service.

In some embodiments, the processor may be configured to: determine that a plurality of external AP devices are available to provide the assistance for support of emergency communication priority access service; and transmit the request frame to each of the plurality of external AP devices.

In some embodiments, the processor may be configured to transmit the request frame to each of the plurality of external AP devices sequentially.

In some embodiments, the processor may be configured to: receive two or more response frames from two or more external AP devices from the plurality of external AP devices; and rank the one or more external AP devices based on one or more predetermined criteria.

In some embodiments, the processor may be configured to: select from the two or more external AP devices an external AP device having the highest rank; and based on the response from the external AP device having the highest rank, provide, with the assistance from the external AP device having the highest rank, support of emergency communication priority access service to the non-AP device associated with the AP device.

In some embodiments, the processor may be configured to transmit a request frame to the at least one external AP device to request assistance in performing emergency communication priority access service authorization for the non-AP device associated with the AP device.

In some embodiments, the processor may be configured to: wait for a response from the at least one external AP device; and after a pre-determined time and not receiving the response from the at least one external AP device, the processor is configured to transmit another request frame to the at least one external AP device to request assistance in performing emergency communication priority access service authorization.

In some embodiments, the processor may be configured to receive unsolicited messages from a subscription service provider network (SSPN) interface via the at least one external AP device.

In some embodiments, the processor may be configured to transmit a request frame to the at least one external AP device to terminate assistance for support for emergency communication priority access service for the non-AP device associated with the AP device.

In some embodiments, the request frame may include an information indicating request for immediate support for emergency communication priority access service.

In some embodiments, the request frame may include an information indicating request for future support for emergency communication priority access service.

One embodiment of the present disclosure may provide an access point (AP) device in a wireless network and coupled to a subscription service provider network (SSPN) interface, the AP device may comprise one or more APs and a processor coupled to the one or more APs. The processor may be configured to: advertise a capability to provide support for emergency communication priority access service; receive a request frame from an external AP device requesting assistance for support for emergency communication priority access service for the external AP device; determine to accept to provide support for emergency communication priority access service for the external AP device; generate a response to accept to provide support for emergency communication priority access service for the external AP device; and transmit the response to the external AP device.

In some embodiments, the processor may be configured to determine to accept to provide support for emergency communication priority access service for the external AP device based on information included in the request frame.

In some embodiments, the processor may be configured to receive a request frame from the external AP device requesting assistance in performing emergency communication priority access service authorization for a non-AP device associated with the external AP device.

In some embodiments, the processor may be configured to: receive one or more unsolicited messages from the SSPN interface; and transmit the one or more unsolicited messages to the external AP device.

In some embodiments, the processor may be configured to receive a request frame from the external AP device requesting termination of assistance for support for emergency communication priority access service for a non-AP device associated with the external AP device.

In some embodiments, the response may include an information field indicating an assistance duration.

In some embodiments, the AP device is a mobile device.

In some embodiments, the processor may be configured to: receive a request frame from a second external AP device requesting assistance for support for emergency communication priority access service; determine to accept to provide support for emergency communication priority access service for the second external AP device; generate a response to accept to provide support for emergency communication priority access service for the second external AP device; and transmit the response to the second external AP device.

BRIEF DESCRIPTION OF THE DRAWINGS

FIG. 2A shows an example of an AP in accordance with an embodiment.

FIG. 7 shows an example of information for a request frame in accordance with an embodiment.

FIG. 8 shows an example of information for a response frame in accordance with an embodiment.

FIG. 12 shows an example of information for terminating the EPCS support in accordance with an embodiment.

FIG. 13 shows an example of information for another response frame in accordance with an embodiment.

FIG. 15 shows an example of information for EPCS authorization in accordance with an embodiment.

FIG. 17 shows an example of information for another response frame in accordance with an embodiment.

FIG. 18 shows an example of information for an authorization support in accordance with an embodiment.

FIG. 19 shows an example of information for another request in accordance with an embodiment.

FIG. 20 shows an example of information for another response in accordance with an embodiment.

FIG. 21 shows an example of information for another request in accordance with an embodiment.

Figure 1:
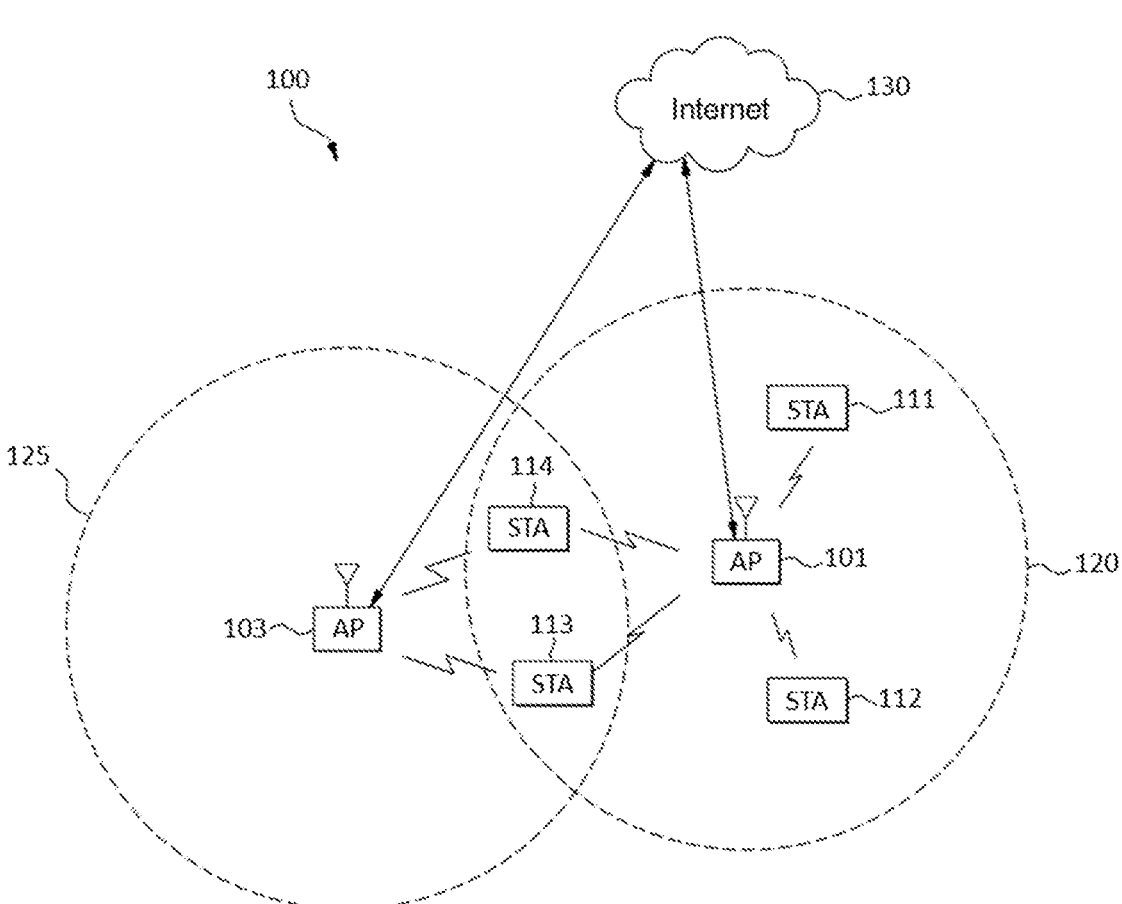
FIG. 1 shows an example of a wireless network in accordance with an embodiment.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below, in connection with the appended drawings, is intended as a description of various implementations and is not intended to represent the only implementations in which the subject technology may be practiced. Rather, the detailed description includes specific details for the purpose of providing a thorough understanding of the inventive subject matter. As those skilled in the art would realize, the described implementations may be modified in various ways, all without departing from the scope of the present disclosure. Accordingly, the drawings and description are to be regarded as illustrative in nature and not restrictive. Like reference numerals designate like elements.

The present disclosure relates to a wireless communication system, for example, to a Wireless Local Area Network (WLAN) technology. WLAN allows devices to access the internet in the 2.4 GHz, 5 GHz, 6 GHz or 60 GHz frequency bands. WLANs are based on the Institute of Electrical and Electronic Engineers (IEEE) 802.11 standards. IEEE 802.11 family of standards aim to increase speed and reliability and to extend the operating range of wireless networks.

The demand of wireless data traffic is rapidly increasing due to the growing popularity among consumers and businesses of smart phones and other mobile data devices, such as tablets, "note pad" computers, net books, eBook readers, and machine type of devices. In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique. MIMO has been adopted in several wireless communications standards such 802.11ac, 802.11ax etc.

The following description is directed to certain implementations for the purpose of describing the innovative aspects of this disclosure. However, a person having ordinary skill in the art will readily recognize that the teachings herein can be applied in a multitude of different ways. The examples in this disclosure are based on WLAN communication according to the Institute of Electrical and Electronics Engineers (IEEE) 802.11 standard, including IEEE 802.11be standard and any future amendments to the IEEE 802.11 standard. However, the described embodiments may be implemented in any device, system or network that is capable of transmitting and receiving radio frequency (RF) signals according to the IEEE 802.11 standard, the Bluetooth standard, Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), 5G NR (New Radio), AMPS, or other known signals that are used to communicate within a wireless, cellular or internet of things (IoT) network, such as a system utilizing 3G, 4G, 5G, 6G, or further implementations thereof, technology.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Multi-link operation (MLO) is a key feature that is currently being developed by the standards body for next generation extremely high throughput (EHT) Wi-Fi systems in IEEE 802.11be. The Wi-Fi devices that support MLO are referred to as multi-link devices (MLD). With MLO, it is possible for a non-AP MLD to discover, authenticate, associate, and set up multiple links with an AP MLD. Channel access and frame exchange is possible on each link between the AP MLD and non-AP MLD.

FIG. 1 shows an example of a wireless network 100 in accordance with an embodiment. The embodiment of the wireless network 100 shown in FIG. 1 is for illustrative purposes only. Other embodiments of the wireless network 100 could be used without departing from the scope of this disclosure.

As shown in FIG. 1, the wireless network 100 may include a plurality of wireless communication devices. Each wireless communication device may include one or more stations (STAs). The STA may be a logical entity that is a singly addressable instance of a medium access control (MAC) layer and a physical (PHY) layer interface to the wireless medium. The STA may be classified into an access point (AP) STA and a non-access point (non-AP) STA. The AP STA may be an entity that provides access to the distribution system service via the wireless medium for associated STAs. The non-AP STA may be a STA that is not contained within an AP-STA. For the sake of simplicity of description, an AP STA may be referred to as an AP and a non-AP STA may be referred to as a STA. In the example of FIG. 1, APs 101 and 103 are wireless communication devices, each of which may include one or more AP STAs. In such embodiments, APs 101 and 103 may be AP multi-link device (MLD). Similarly, STAs 111-114 are wireless communication devices, each of which may include one or more non-AP STAs. In such embodiments, STAs 111-114 may be non-AP MLD.

The APs 101 and 103 may communicate with at least one network 130, such as the Internet, a proprietary Internet Protocol (IP) network, or other data network. The AP 101 provides wireless access to the network 130 for a plurality of stations (STAs) 111-114 with a coverage area 120 of the AP 101. The APs 101 and 103 may communicate with each other and with the STAs using Wi-Fi or other WLAN communication techniques.

In FIG. 1, dotted lines show the approximate extents of the coverage area 120 and 125 of APs 101 and 103, which are shown as approximately circular for the purposes of illustration and explanation. It should be clearly understood that coverage areas associated with APs, such as the coverage areas 120 and 125, may have other shapes, including irregular shapes, depending on the configuration of the APs.

As described in more detail below, one or more of the APs may include circuitry and/or programming for management of MU-MIMO and OFDMA channel sounding in WLANs. Although FIG. 1 shows one example of a wireless network 100, various changes may be made to FIG. 1. For example, the wireless network 100 may include any number of APs and any number of STAs in any suitable arrangement. Also, the AP 101 may communicate directly with any number of STAs and provide those STAs with wireless broadband access to the network 130. Similarly, each AP 101 and 103 may communicate directly with the network 130 and provides STAs with direct wireless broadband access to the network 130. Further, the APs 101 and/or 103 may provide access to other or additional external networks, such as external telephone networks or other types of data networks.

Figure 2A:
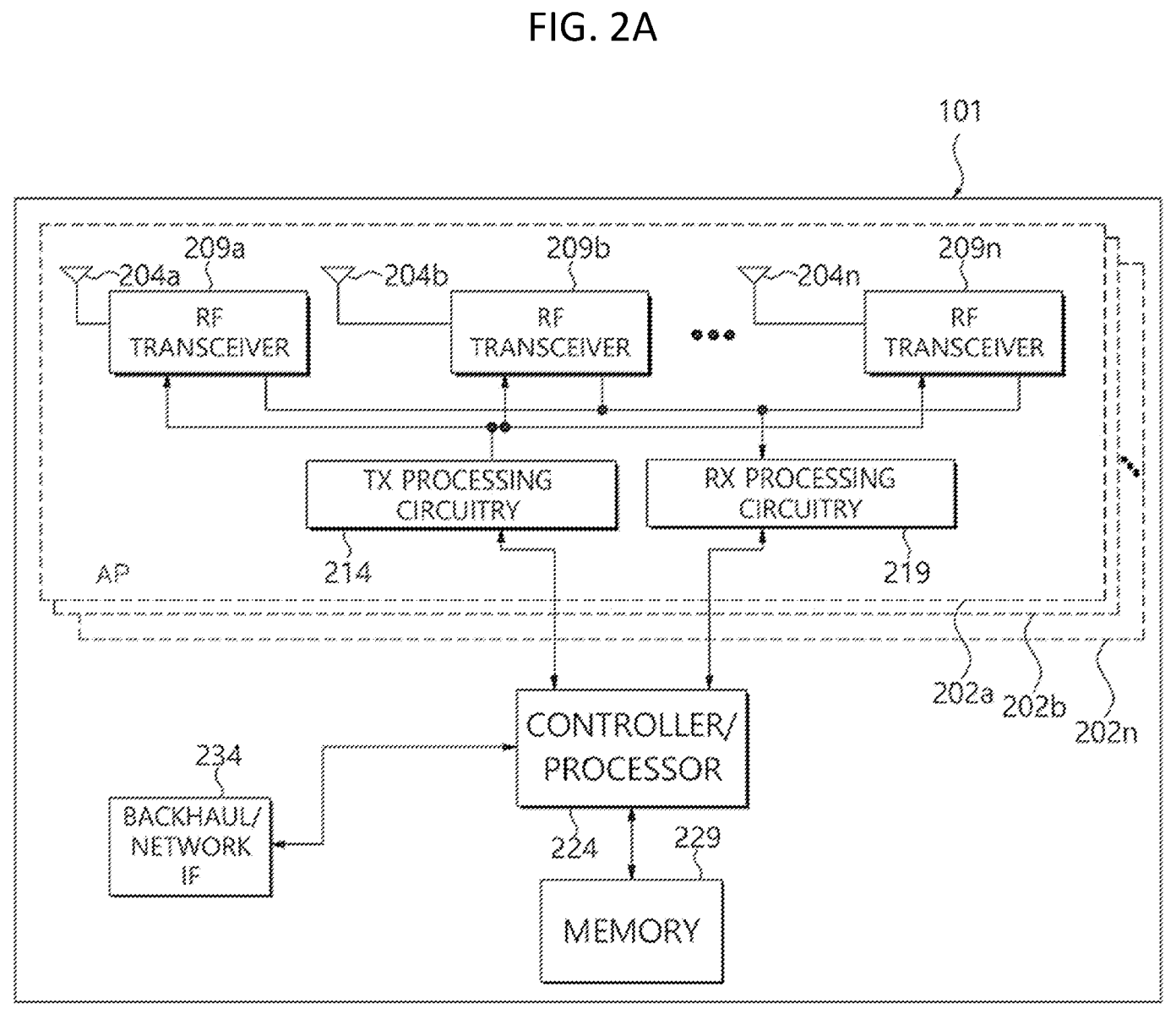

FIG. 2A shows an example of an AP 101 in accordance with an embodiment. The embodiment of the AP 101 shown in FIG. 2A is for illustrative purposes, and the AP 103 of FIG. 1 could have the same or similar configuration. However, APs come in a wide range of configurations, and FIG. 2A does not limit the scope of this disclosure to any particular implementation of an AP.

As shown in FIG. 2A, the AP 101 may include multiple antennas 204a-204n, multiple radio frequency (RF) transceivers 209a-209n, transmit (TX) processing circuitry 214, and receive (RX) processing circuitry 219. The AP 101 may also include a controller/processor 224, a memory 229, and a backhaul or network interface 234. The RF transceivers 209a-209n receive, from the antennas 204a-204n, incoming RF signals, such as signals transmitted by STAs in the network 100. The RF transceivers 209a-209n down-convert the incoming RF signals to generate intermediate (IF) or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 may include one or more processors or other processing devices that control the overall operation of the AP 101. For example, the controller/processor 224 may control the reception of uplink signals and the transmission of downlink signals by the RF transceivers 209a-209n, the RX processing circuitry 219, and the TX processing circuitry 214 in accordance with well-known principles. The controller/processor 224 may support additional functions as well, such as more advanced wireless communication functions. For instance, the controller/processor 224 may support beam forming or directional routing operations in which outgoing signals from multiple antennas 204a-204n are weighted differently to effectively steer the outgoing signals in a desired direction. The controller/processor 224 may also support OFDMA operations in which outgoing signals are assigned to different subsets of subcarriers for different recipients (e.g., different STAs 111-114). Any of a wide variety of other functions could be supported in the AP 101 by the controller/processor 224 including a combination of DL MU-MIMO and OFDMA in the same transmit opportunity. In some embodiments, the controller/processor 224 may include at least one microprocessor or microcontroller. The controller/processor 224 may also be capable of executing programs and other processes resident in the memory 229, such as an OS. The controller/processor 224 may move data into or out of the memory 229 as required by an executing process.

The controller/processor 224 may also be coupled to the backhaul or network interface 234. The backhaul or network interface 234 may allow the AP 101 to communicate with other devices or systems over a backhaul connection or over a network. The interface 234 may support communications over any suitable wired or wireless connection(s). For example, the interface 234 may allow the AP 101 to communicate over a wired or wireless local area network or over a wired or wireless connection to a larger network (such as the Internet). The interface 234 may include any suitable structure supporting communications over a wired or wireless connection, such as an Ethernet or RF transceiver. The memory 229 may be coupled to the controller/processor 224. Part of the memory 229 may include a RAM, and another part of the memory 229 may include a Flash memory or other ROM.

As described in more detail below, the AP 101 may include circuitry and/or programming for management of channel sounding procedures in WLANs. Although FIG. 2A illustrates one example of AP 101, various changes may be made to FIG. 2A. For example, the AP 101 may include any number of each component shown in FIG. 2A. As a particular example, an AP may include a number of interfaces 234, and the controller/processor 224 may support routing functions to route data between different network addresses. As another example, while shown as including a single instance of TX processing circuitry 214 and a single instance of RX processing circuitry 219, the AP 101 may include multiple instances of each (such as one per RF transceiver). Alternatively, only one antenna and RF transceiver path may be included, such as in legacy APs. Also, various components in FIG. 2A may be combined, further subdivided, or omitted and additional components may be added according to particular needs.

As shown in FIG. 2A, in some embodiments, the AP 101 may be an AP MLD that includes multiple APs 202a-202n. Each AP 202a-202n is affiliated with the AP MLD 101 and may include multiple antennas 204a-204n, multiple radio frequency (RF) transceivers 209a-209n, transmit (TX) processing circuitry 214, and receive (RX) processing circuitry 219. Each APs 202a-202n may independently communicate with the controller/processor 224 and other components of the AP MLD 101. FIG. 2A shows that each AP 202a-202n has separate multiple antennas, but each AP 202a-202n may share multiple antennas 204a-204n without needing separate multiple antennas. Each AP 202a-202n may represent a physical (PHY) layer and a lower media access control (MAC) layer.

Figure 2B:
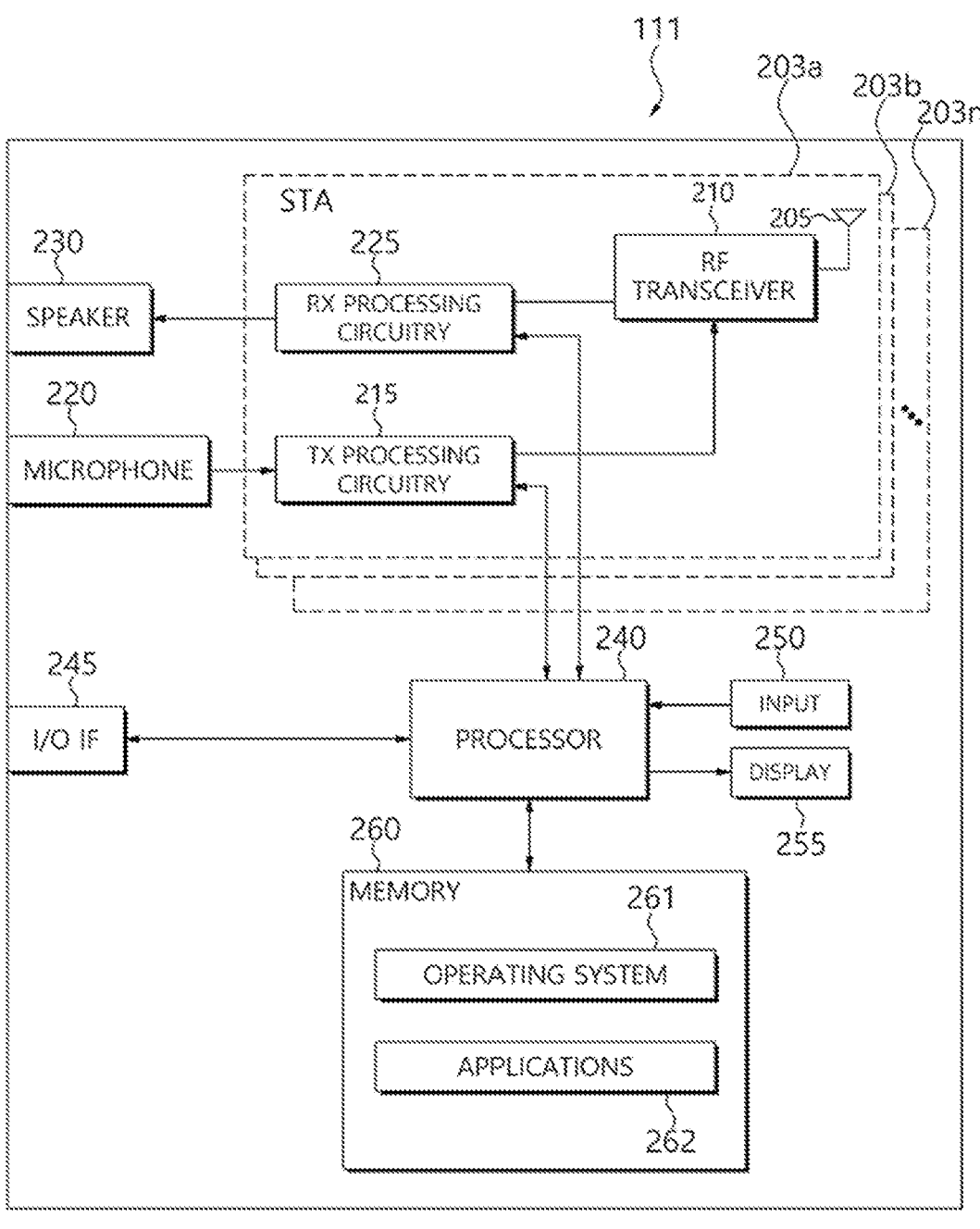
FIG. 2B shows an example of a STA in accordance with an embodiment.

FIG. 2B shows an example of a STA 111 in accordance with an embodiment. The embodiment of the STA 111 shown in FIG. 2B is for illustrative purposes, and the STAs 111-114 of FIG. 1 may have the same or similar configuration. However, STAs come in a wide variety of configurations, and FIG. 2B does not limit the scope of this disclosure to any particular implementation of a STA.

As shown in FIG. 2B, the STA 111 may include antenna(s) 205, a RF transceiver 210, TX processing circuitry 215, a microphone 220, and RX processing circuitry 225. The STA 111 may also include a speaker 230, a controller/processor 240, an input/output (I/O) interface (IF) 245, a touchscreen 250, a display 255, and a memory 260. The memory 260 may include an operating system (OS) 261 and one or more applications 262.

The RF transceiver 210 may receive, from the antenna(s) 205, an incoming RF signal transmitted by an AP of the network 100. The RF transceiver 210 may down-convert the incoming RF signal to generate an IF or baseband signal. The IF or baseband signal may be sent to the RX processing circuitry 225, which may generate a processed baseband signal by filtering, decoding, and/or digitizing the baseband or IF signal. The RX processing circuitry 225 may transmit the processed baseband signal to the speaker 230 (such as for voice data) or to the controller/processor 240 for further processing (such as for web browsing data).

The TX processing circuitry 215 may receive analog or digital voice data from the microphone 220 or other outgoing baseband data (such as web data, e-mail, or interactive video game data) from the controller/processor 240. The TX processing circuitry 215 may encode, multiplex, and/or digitize the outgoing baseband data to generate a processed baseband or IF signal. The RF transceiver 210 may receive the outgoing processed baseband or IF signal from the TX processing circuitry 215 and up-convert the baseband or IF signal to an RF signal that may be transmitted via the antenna(s) 205.

The controller/processor 240 may include one or more processors and execute the basic OS program 261 stored in the memory 260 in order to control the overall operation of the STA 111. In one such operation, the controller/processor 240 may control the reception of downlink signals and the transmission of uplink signals by the RF transceiver 210, the RX processing circuitry 225, and the TX processing circuitry 215 in accordance with well-known principles. The controller/processor 240 may also include processing circuitry configured to provide management of channel sounding procedures in WLANs. In some embodiments, the controller/processor 240 may include at least one microprocessor or microcontroller.

The controller/processor 240 may also be capable of executing other processes and programs resident in the memory 260, such as operations for management of channel sounding procedures in WLANs. The controller/processor 240 may move data into or out of the memory 260 as required by an executing process. In some embodiments, the controller/processor 240 may be configured to execute a plurality of applications 262, such as applications for channel sounding, including feedback computation based on a received null data packet announcement (NDPA) and null data packet (NDP) and transmitting the beamforming feedback report in response to a trigger frame (TF). The controller/processor 240 may operate the plurality of applications 262 based on the OS program 261 or in response to a signal received from an AP. The controller/processor 240 may also be coupled to the I/O interface 245, which provides STA 111 with the ability to connect to other devices such as laptop computers and handheld computers. The I/O interface 245 may be the communication path between these accessories and the main controller/processor 240.

The controller/processor 240 may also be coupled to the input 250 (such as a touchscreen) and the display 255. The operator of the STA 111 may use the input 250 to enter data into the STA 111. The display 255 may be a liquid crystal display, light emitting diode display, or other display capable of rendering text and/or at least limited graphics, such as from web sites. The memory 260 may be coupled to the controller/processor 240. Part of the memory 260 may include a random access memory (RAM), and another part of the memory 260 may include a Flash memory or other read-only memory (ROM).

Although FIG. 2B shows one example of STA 111, various changes may be made to FIG. 2B. For example, various components in FIG. 2B may be combined, further subdivided, or omitted and additional components may be added according to particular needs. In particular examples, the STA 111 may include any number of antenna(s) 205 for MIMO communication with an AP 101. In another example, the STA 111 may not include voice communication or the controller/processor 240 may be divided into multiple processors, such as one or more central processing units (CPUs) and one or more graphics processing units (GPUs). Also, while FIG. 2B illustrates the STA 111 configured as a mobile telephone or smartphone, STAs may be configured to operate as other types of mobile or stationary devices.

As shown in FIG. 2B, in some embodiment, the STA 111 may be a non-AP MLD that includes multiple STAs 203a-203n. Each STA 203a-203n may be affiliated with the non-AP MLD 111 and may include an antenna(s) 205, a RF transceiver 210, TX processing circuitry 215, and RX processing circuitry 225. Each STAs 203a-203n may independently communicate with the controller/processor 240 and other components of the non-AP MLD 111. FIG. 2B shows that each STA 203a-203n has a separate antenna, but each STA 203a-203n may share the antenna 205 without needing separate antennas. Each STA 203a-203n may represent a physical (PHY) layer and a lower media access control (MAC) layer.

Figure 3:
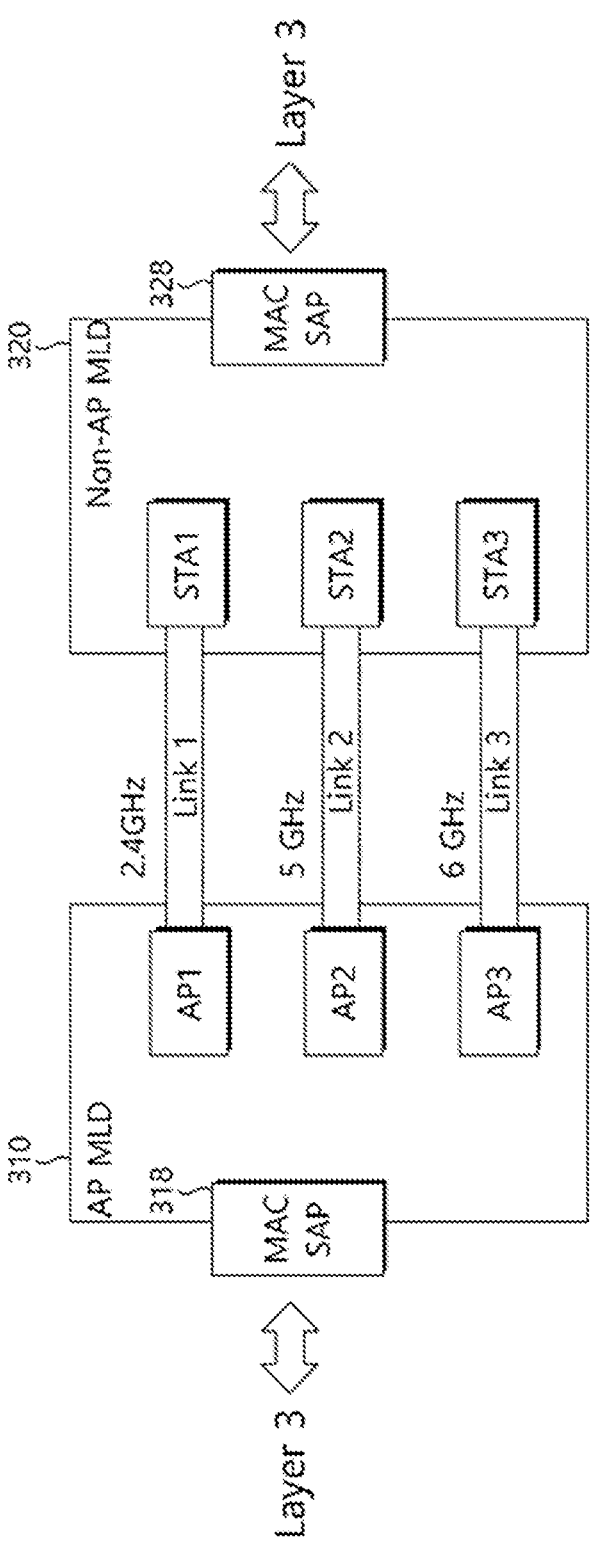
FIG. 3 shows an example of a multi-link communication operation in accordance with an embodiment.

FIG. 3 shows an example of multi-link communication operation in accordance with an embodiment. The multi-link communication operation may be applicable to IEEE 802.11be standard and any future amendments to IEEE 802.11 standard. In FIG. 3, an AP MLD 310 may be the wireless communication device 101 and 103 in FIG. 1 and a non-AP MLD 220 may be one of the wireless communication devices 111-114 in FIG. 1.

As shown in FIG. 3, the AP MLD 310 may include a plurality of affiliated APs, for example, including AP 1, AP 2 and AP 3. Each affiliated AP may include a PHY interface to wireless medium (Link 1, Link 2, or Link 3). The AP MLD 310 may include a single MAC service access point (SAP) 318 through which the affiliated APs of the AP MLD 310 may communicate with a higher layer (Layer 3 or network layer). Each affiliated AP of the AP MLD 310 may have a MAC address (lower MAC address) different from any other affiliated APs of the AP MLD 310. The AP MLD 310 may have a MLD MAC address (upper MAC address) and the affiliated APs share the single MAC SAP 318 to Layer 3. Thus, the affiliated APs may share a single IP address, and the Layer 3 may recognize the AP MLD 310 by assigning the single IP address.

The non-AP MLD 320 may include a plurality of affiliated STAs, for example, including STA 1, STA 2 and STA 3. Each affiliated STA may include a PHY interface to the wireless medium (Link 1, Link 2, or Link 3). The non-AP MLD 320 may include a single MAC SAP 328 through which the affiliated STAs of the non-AP MLD 320 may communicate with a higher layer (Layer 3 or network layer). Each affiliated STA of the non-AP MLD 320 may have a MAC address (lower MAC address) different from any other affiliated STAs of the non-AP MLD 320. The non-AP MLD 320 may have a MLD MAC address (upper MAC address) and the affiliated STAs may share the single MAC SAP 328 to Layer 3. Thus, the affiliated STAs may share a single IP address, and the Layer 3 may recognize the non-AP MLD 320 by assigning the single IP address.

The AP MLD 310 and the non-AP MLD 320 may set up multiple links between their affiliate APs and STAs. In this example, the AP 1 and the STA 1 may set up Link 1 which may operate in 2.4 GHz band. Similarly, the AP 2 and the STA 2 may set up Link 2 which may operate in 5 GHz band, and the AP 3 and the STA 3 may set up Link 3 which may operate in 6 GHz band. Each link may enable channel access and frame exchange between the AP MLD 310 and the non-AP MLD 320 independently, which may increase data throughput and reduce latency.

In order to prioritize transmission of different types of traffic, which may be identified by a traffic identifier (TID), across the setup links, the non-AP MLD 320 may negotiate a TID-to-link mapping with the AP MLD 310. The TID-to-link mapping may allow the AP MLD 310 and the non-AP MLD 320 to determine how frames belonging to TIDs may be assigned for transmission on each setup link in the uplink and downlink directions, respectively. When at least one TID associated with a non-AP MLD 320 is mapped to a setup link in either uplink or downlink direction, the link may be referred to as an enabled link for the non-AP MLD 320. By default, all TIDs are mapped to all the setup links between the AP MLD 310 and the non-AP MLD 320, and this mapping may be referred to as a default TID-to-link mapping. During association, the non-AP MLD 320 may use a negotiation procedure to negotiate a non-default mapping of TIDs to the setup links, by including a TID-to-Link Mapping element in an association request frame or a reassociation request frame. The non-default mapping may be either where all TIDs are mapped to the same subset of setup links, or where not all TIDs are mapped to the same subset of setup links. The AP MLD 310 may also use a broadcast procedure to indicate switching to a non-default mapping for all associated non-AP MLDs. In default mapping mode, all TIDs may be mapped to all setup link for downlink and uplink and all setup links may be enabled. The non-AP MLD 320 may operate under default mapping mode when a TID-to-link mapping negotiation did not occur or was unsuccessful.

Emergency telecommunication services have been implemented in a number of countries with the objective of providing prioritized access in the times of disasters or emergencies. Examples of such telecommunication services in the United States include government emergency telecommunication service (GETS), wireless priority service (WPS), next generation network priority services (NGN priority services), telecommunications service priority (TSP), etc. Such services have also been implemented in other countries. Examples of such services include blue light mobile service in Belgium, mobile telecommunications privileged access scheme in Great Britain, disaster priority telephone in Japan, etc. Typically, such services are subscription based, operator controlled, enabled through global standards and are offered over commercial network infrastructure.

In recent times there has been a growing need for such services over Wi-Fi networks. In IEEE 802.11be, Emergency Preparedness Communication Services (EPCS) has been introduced with the goal of providing prioritized access to certain authorized users. This feature allows emergency services, such as public safety agencies, to have reliable and uninterrupted access to wireless networks, for example during critical situations or network congestion. It allows emergency-related traffic to be given precedence over other types of network traffic. The highest priority class, typically referred to as the Emergency Services (ES) class, is reserved for emergency-related communications. Other lower priority classes are used for regular data traffic. The standard defines different Access Categories (AC's) that determine the different priorities of network access. Priority access involves treating the EPCS traffic with a higher priority in obtaining channel access and in allocation of network resources. The service is only available to designated, authorized devices.

As a part of this service, the user that has associated with an AP can be authorized by the AP to take advantage of EPCS service. With EPCS capability enabled, a device may obtain higher priority in channel access over non-EPCS devices. For EPCS, the AP MLD assigns higher priority EDCA parameters to the devices with EPCS features enabled. The Enhanced Distributed Channel Access (EDCA) mechanism may be employed to manage the contention for channel access. EDCA may assign different contention parameters, such as contention window size and arbitration interframe space (AIFS), to each AC. For example, the ES AC is configured with the most favorable parameters, allowing it to contend for channel access more aggressively than other ACs. EDCA provides contention-free access to the channel during a TXOP. Once authorized, the user can use an enhanced EDCA parameter set with values for parameters such as CWmin[AC], CWmax[AC], AIFSN[AC], TXOP[AC], etc. which are different from those for other STAs associated with the same AP. With this enhanced EDCA parameter set, the non-AP MLD that is authorized by the AP MLD, benefits from prioritized access as it can capture the channel faster compared to other users in the network. After EPCS is disabled, the non-AP MLD can update its EDCA parameter set to match that of other non-EPCS users in the network.

For a non-AP MLD, EPCS feature may be enabled through negotiation with the AP MLD. APs that have EPCS priority access activated may advertise this capability in Beacon and Probe Response frames. The EPCS access may be granted on an individual basis. For example, APs authorize non-AP STAs to use EPCS priority access based on locally available information or through a service provider's authorization infrastructure. Upon approval from the AP MLD, higher priority EDCA parameters may be granted to the EPCS-enabled devices. EDCA Parameters are carried in EDCA Parameters Set element, which is typically carried in the Beacon frame. For MLD operation, each link can have its own EDCA parameters. The AP MLD broadcasts the Beacon frame on each link carrying the EDCA Parameters Set element. Beacon frames are management frames that may be transmitted periodically, for example to announce the presence of a wireless LAN and to synchronize the members of the service set.

It should be noted that although examples, discussions and figures in this disclosure depict AP multi-link devices (MLD's), the disclosure is also applicable to network with single link devices.

In IEEE 802.11be, EPCS operation is expected to be robust, even under extreme environmental and network conditions. These conditions may include, for example, scenarios involving damage to network infrastructure from any physical or cyber-attack on the network. Such threats can render one or more network components inoperable and disrupt EPCS service and communication. Further, EPCS operation is also expected to be robust to dynamic changes to network infrastructure, and to enhance the range or the coverage area for EPCS service. These are only some examples of conditions that may benefit from the solutions described in this disclosure.

I. Examples of Network Problems and Issues

A. Example of Network Communication Disruptions

Figure 4:
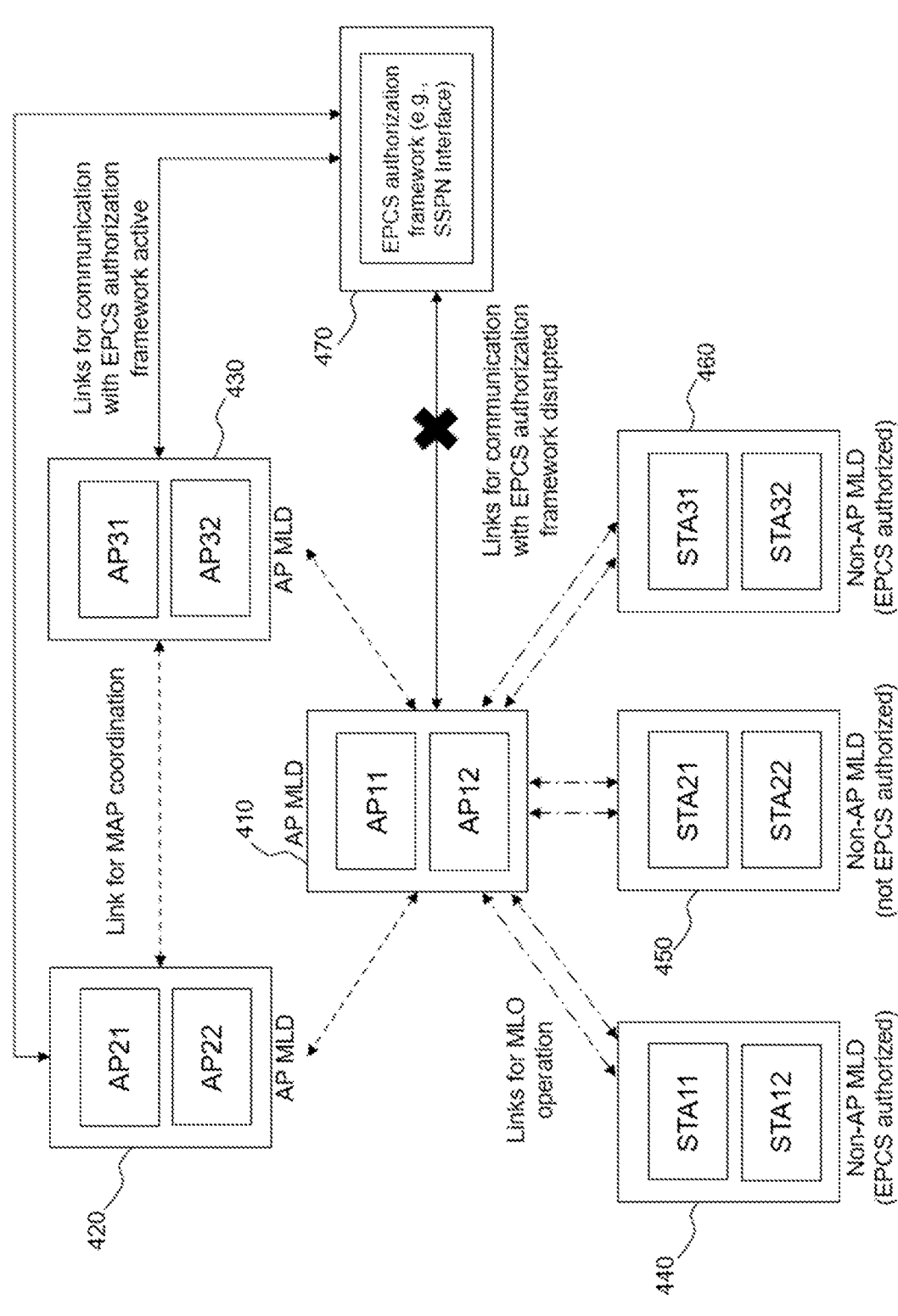
FIG. 4 shows another example of a multi-link communication operation in accordance with an embodiment.

An example of network communication disruptions includes network infrastructure damage that disrupts communication between an AP and an EPCS authorization framework. FIG. 4 illustrates an example network disruption.

FIG. 4 shows an example of wireless communication in accordance with some embodiments. This example may be applicable to IEEE 802.11be standard and any future amendments to IEEE 802.11 standard. The AP MLD 410, 420 and 430, and the non-AP MLD 440, 450 and 460 may be examples of the AP MLD 310 and the non-AP MLD 320 illustrated in FIG. 3, respectively. FIG. 4 shows an example of multi-link communication operation. The AP MLD 410 may include two affiliated APs (AP 11 and AP 12), the AP MLD 420 may include two affiliated APs (AP 21 and AP 22), the AP MLD 430 may include two affiliated APs (AP 31 and AP 32); and the non-AP MLD 440 may include two affiliated STAs (STA 11 and STA 12), the non-AP MLD 450 may include two affiliated STAs (STA 21 and STA 22), and the non-AP MLD 460 may include two affiliated STAs (STA 31 and STA 32). The AP MLD 410, 420, 430 may also be an example of the wireless communication device 101 and 103 in FIG. 1 and the non-AP MLD 440, 450, 460 may be an example of one of the wireless communication devices 111-114 in FIG. 1, respectively. Although FIG. 4 shows an example of two APs for each AP MLD, and two STAs for each non-AP MLD, there may less or more number of APs and STAs.

With MLO, the non-AP MLD 440, 450, 460 may discover, authenticate, associate, and set up multiple links with the AP MLD 410, as an example. Channel access and frame exchange is possible on each link between the AP MLD 410 and non-AP MLD 440, 450, 460. In the example of FIG. 4, two links may be set up between the AP MLD 410 and each non-AP MLD 440, 450, 460, shown as "Links for MLO operation" in FIG. 4.

In the example of FIG. 4, AP MLD 410 also has a communication link (which may be wired or wireless) with other AP MLDs in the vicinity, for example, AP MLD 420 and AP MLD 430. The communication links may be set up using, e.g., Multiple AP (MAP) coordination. In FIG. 4, AP MLD 410 may form links for MAP coordination with AP MLD 420 and AP MLD 430. AP MLD 420 and AP MLD 430 may also form similar links with each other.

An AP may interact with a subscription service provider network (SSPN) interface, using external networks, for example, for the purpose of authenticating users and provisioning services. The SSPN interface may provide, among others, the ability for an AP to consult an SSPN for authenticating and authorizing a specific non-AP STA and to report statistics and status information to the SSPN.

In the example of FIG. 4, the AP MLD 410, 420, 430 may communicate with the EPCS authorization framework 470 (e.g., the SSPN interface) to, for example, authorize devices for EPCS priority access service. For this example, through the communication between the AP MLD 410 and the EPCS authorization framework 470, non-AP MLD 440 and non-AP MLD 460 have been authorized for EPCS priority access service. Non-AP MLD 450 has not been authorized for EPCS priority access service. In an example, in some circumstances (e.g., extreme environmental conditions, cyber-attacks, etc.), the communication between the AP MLD 410 and the EPCS authorization framework 470 may be disrupted. This may disrupt the AP MLD 410's capability to authorize devices for EPCS priority access service. Further, for existing EPCS priority access authorized devices (e.g., non-AP MLD 440 and non-AP MLD 460), AP MLD 410 can no longer receive updates on their EPCS authorization capability (e.g., when a device's EPCS authorization is revoked by the SSPN device, the SSPN device can no longer send an unsolicited update to the AP). The present disclosure provides solutions to address such network disruptions so that an AP, for example AP MLD 410, may continue to seamlessly provide EPCS priority access service to devices associated with it.

B. Example of Dynamic Network Infrastructure Modification

Figure 5:
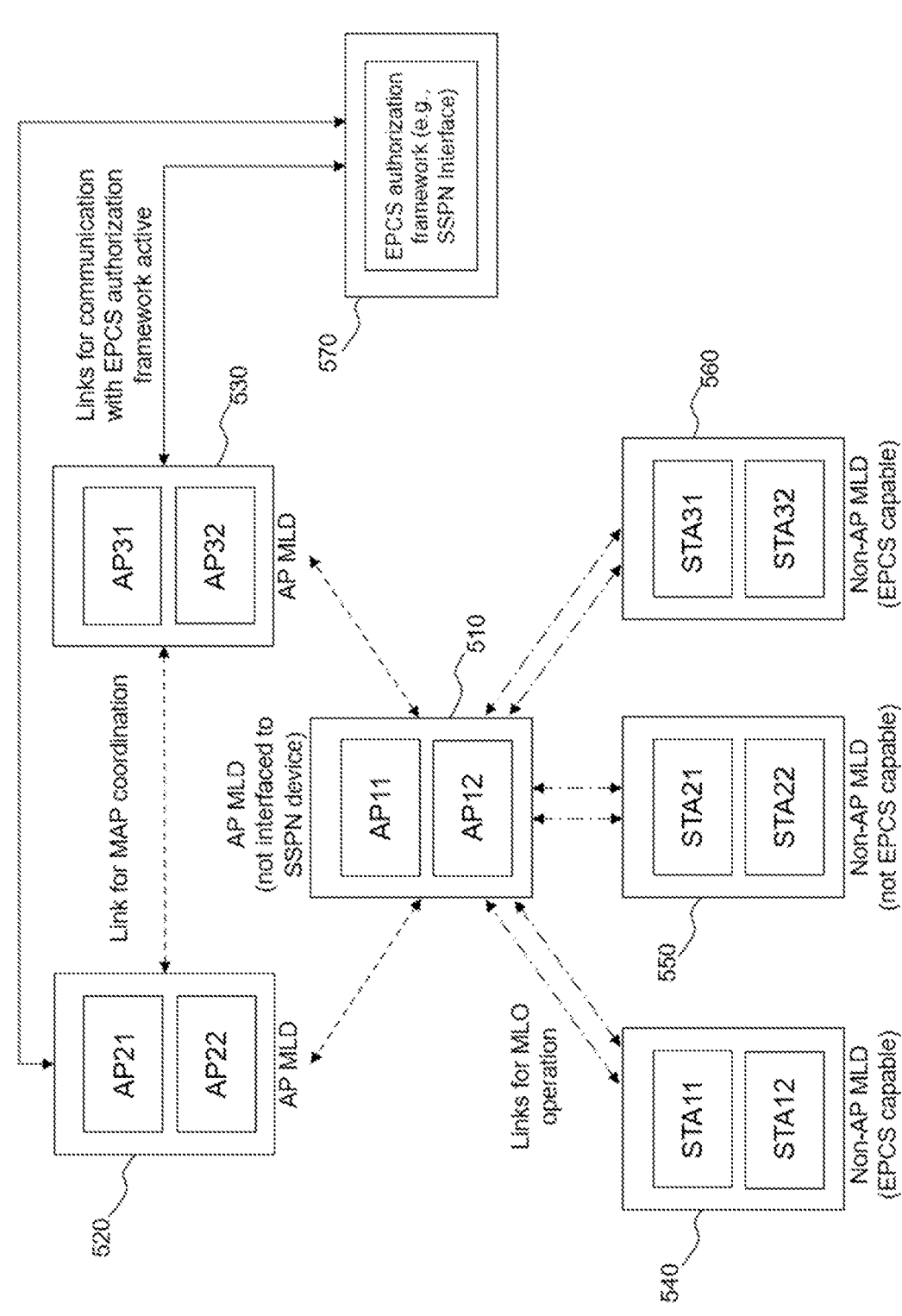
FIG. 5 shows an example of a dynamic network infrastructure modification in accordance with an embodiment.

FIG. 5 shows an example of wireless communication in accordance with some embodiments. This example may be applicable to IEEE 802.11be standard and any future amendments to IEEE 802.11 standard. FIG. 5 illustrates an example of dynamic network infrastructure modification. In this example, the dynamic network infrastructure modification may include the deployment of a mobile AP (or APs). The AP MLD 510, 520, 530, and the non-AP MLD 540, 550, 560 may be examples of the AP MLD 310 and the non-AP MLD 320 illustrated in FIG. 3, respectively.

In this example, AP MLD 520 and AP MLD 530 support EPCS priority access feature and are deployed to provide priority access service. FIG. 5 shows AP MLD 520 and AP MLD 530 having links for communication with EPCS authorization framework 570 for this purpose. However, due to some circumstances, the coverage of AP MLD 520 and AP MLD 530 has a coverage hole or alternatively an area with weak signal strength, causing the service to become unavailable in that region. As an example solution for this issue, a mobile AP may be deployed in that region temporarily. In another example, a mobile AP MLD may be deployed in an emergency vehicle responding to a disaster. This mobile AP may be an operator controlled device instead of an end user device. With the availability of a deployed mobile AP, the non-AP MLDs in the coverage hole region or alternatively the region with weak signal strength may gain wireless connectivity by associating with the deployed mobile AP. In the example of FIG. 5, AP MLD 510 may be deployed as the mobile AP MLD. However, the mobile AP needs connection to the EPCS authorization framework 570 (e.g., SSPN interface).

In the example of FIG. 5, AP MLD 510 has two affiliated STAs (AP11 and AP12). AP MLD 520 has two affiliated STAs (AP21 and AP22). AP MLD 530 has two affiliated STAs (AP31 and AP32). The mobile AP MLD 510 may have a number of non-AP MLDs associated with it. For example, these non-AP MLDs may include non-AP MLD 540, non-AP MLD 550 and non-AP MLD 560. Similar to the AP MLDs, the non-AP MLDs may also have a number of non-AP STAs affiliated with them.

Further in this example, non-AP MLD 540 and non-AP MLD 560 are EPCS capable and may thus be authorized for EPCS priority access service. Non-AP MLD 550 is not EPCS capable and cannot be authorized for EPCS priority access service. As shown in this example, AP MLD 510 has formed communication link(s) (e.g., via MAP coordination) with AP MLD 520 and AP MLD 530, which may be in the vicinity with AP MLD 510. Similarly, AP MLD 520 and AP MLD 530 have also formed similar links with each other.

When the AP MLD 510 is deployed as a mobile AP, it may not have connection to the EPCS authorization framework 570. Therefore, even though non-AP MLD 540 and non-AP MLD 560 are EPCS capable, they cannot be authorized for EPCS priority access service by AP MLD 510. A solution described herein may make such mobile AP deployments efficient from the point of view of providing EPCS priority access service.

C. Example of Range Enhancement Needs

In yet another example, a non-AP MLD may be within the range of an AP MLD, but the AP MLD is not linked to the EPCS authorization framework, thus it is not capable of authorizing EPCS priority access service. Consequently, the non-AP MLD cannot be authorized for EPCS priority access service.

Referring to FIG. 5 as example, however now AP MLD 510 is a normal AP instead of a deployed mobile AP. Further, non-AP MLD 540 and non-AP MLD 560 may be out of the range of AP MLD 520 and AP MLD 530 but within the range of AP MLD 510. Thus, instead of associating with AP MLD 520 or AP MLD 530, non-AP MLD 540 and non-AP MLD 560 may associate with AP MLD 510. However, AP MLD 510 is not capable of authorizing EPCS priority access service as it is not linked to the EPCS authorization framework 570. Consequently, non-AP MLD 540 and non-AP MLD 560 cannot be authorized for EPCS priority access service. A solution described herein may address such a scenario and enhance the range or the coverage area in which EPCS capable devices may continue to benefit from the priority access service.

II. Examples of Solutions for EPCS Operation During Network Problems and Issues

As described herein and used in the following examples, an "assistance-seeking AP MLD" may be defined as an AP MLD that may need assistance in running EPCS operation. For example, an assistance-seeking AP MLD may be an EPCS enabled AP MLD such as those in the above examples regarding network disruptions or network dynamic modifications of FIGS. 4 and 5. Or an assistance-seeking AP MLD may be a normal AP MLD such as in the above example of out-of-range AP MLD. For example, in FIGS. 4 and 5, AP MLD 510 may be considered as an assistance-seeking AP MLD.

An "assisting AP MLD" may be defined as an EPCS enabled AP MLD that may provide support to the assistance-seeking AP MLD, for example to run EPCS related operations. In FIGS. 4 and 5, AP MLD 520 and AP MLD 530 may be considered as assisting AP MLDs. In some embodiments, assisting AP MLDs may either be a part of the same extended service set (ESS) or may be operating independently. Further, the term EPCS support may be used to refer to the support that the assisting AP MLD may provide to the assistance-seeking AP MLD so that the assistance-seeking AP MLD may provide and/or continue to provide EPCS priority access services to its associated STA(s).

A. EPCS Supports for Setup and Teardown

1. Initial EPCS Support Setup Procedure to Determine an Assisting AP MLD

In some embodiments, an assistance-seeking AP MLD may need to search for an assisting AP MLD. An example is during an initial EPCS support setup procedure. In some embodiments, an assistance-seeking AP MLD may request other AP MLD(s) in its vicinity to provide and/or continue providing support for EPCS priority access services to its associated non-AP MLD(s).

Figure 6:
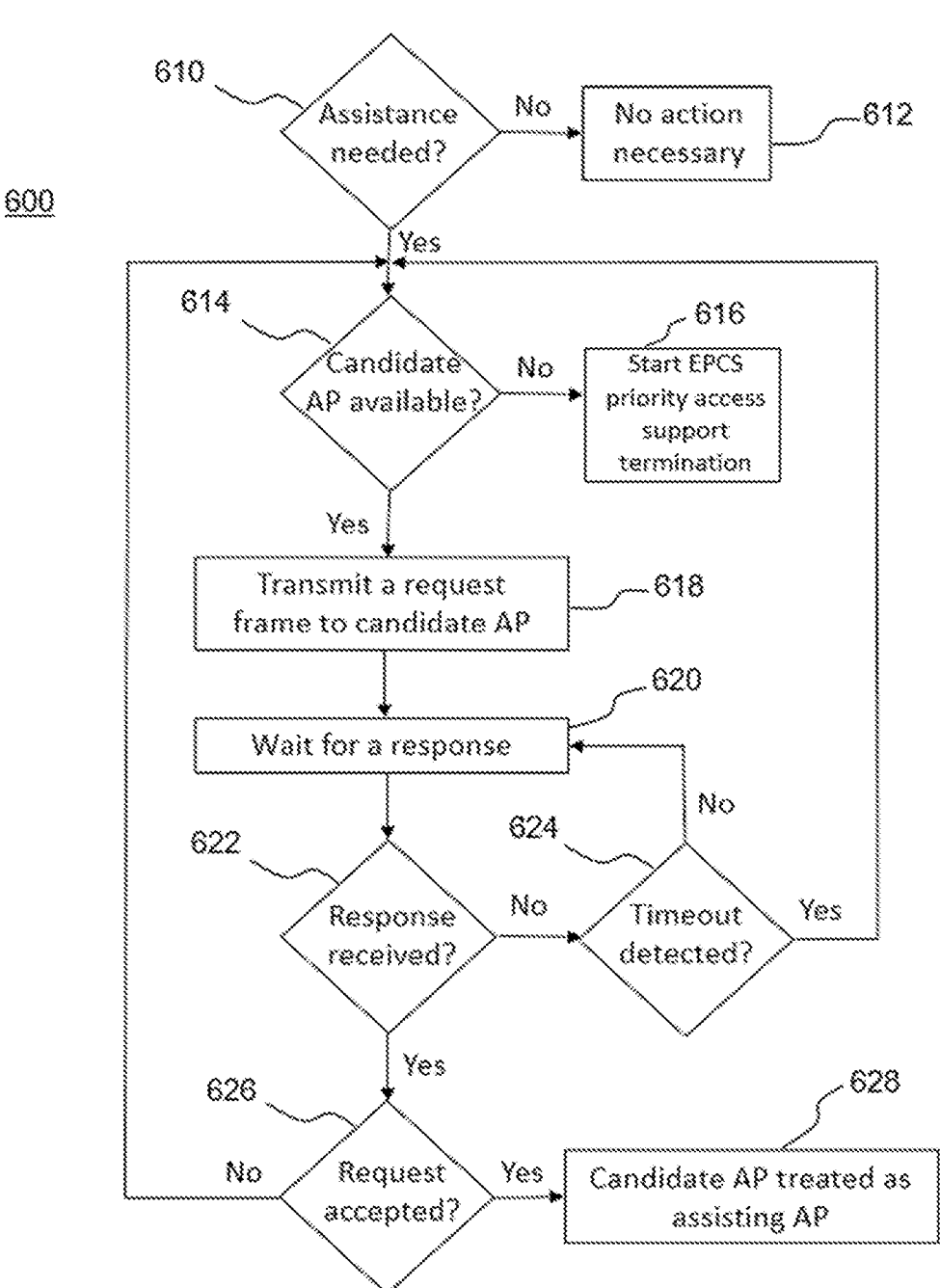
FIG. 6 shows an example of a process for initial EPCS support setup in accordance with an embodiment.

FIG. 6 shows an example of a wireless communication process 600 of an assistance-seeking AP MLD requesting other AP MLD(s) in its vicinity to provide and/or continue providing support for EPCS priority access in accordance with some embodiments. This example may be applicable to IEEE 802.11be standard and any future amendments to IEEE 802.11 standard.

In some embodiments, in operation 610, an AP MLD may determine if it needs assistance for support for EPCS priority access services, for example, to its associated non-AP MLD(s). The AP MLD may determine that it needs assistance, for example, upon detecting a disconnection from the SSPN interface. When the AP MLD determines that it does not need assistance for support for EPCS priority access services, the process 600 may proceed to operation 612, where no further action is needed.

When the AP MLD determines that it needs assistance for support for EPCS priority access services, it may become, and will be referred to as, an assistance-seeking AP MLD. In operation 614, the assistance-seeking AP MLD may determine if at least one candidate assisting AP MLD is available, for example, AP MLD(s) in the vicinity that advertise the capability to provide support for EPCS priority access. Corresponding embodiments for AP MLDs to advertise availability are described below in the section titled EPCS Assistance Support Capability Advertisement.

When the assistance-seeking AP MLD determines that no candidate assisting AP MLD is available, the process may proceed to operation 616. In operation 616, the assistance-seeking AP MLD may start a process of EPCS priority access support termination, which will be discussed in FIG. 10 below.

When the assistance-seeking AP MLD determines that at least one candidate assisting AP MLD is available, the process may proceed to operation 618. In operation 618, the assistance-seeking AP MLD may transmit a request frame to the AP MLD(s) in the vicinity that advertise the capability to provide support for EPCS priority access. In some embodiments, the request frame may include one or more of the information shown in Table 700 as shown in FIG. 7.

In some embodiments, when there are more than one AP MLD(s) in the vicinity of the assistance-seeking AP MLD that are candidates to become the assisting AP MLD, the assistance-seeking AP MLD may transmit a request to these AP MLDs in a sequential manner. In some embodiments, the request may be made over the distribution system (DS) or over the air when the candidate AP MLD(s) are a part of the same ESS. When the AP MLD(s) in the vicinity are not a part of the same ESS, then the request may be made over the air.

After transmitting a request frame to a candidate AP MLD, at operation 620, the assistance-seeking AP MLD may wait to receive a response from the candidate AP MLD.

In operation 622, when a response is received from a candidate AP MLD, the process 600 proceeds to operation 626. If a response is not received, for example a timeout is detected in operation 624, within the time indicated in the "Response timeout" information in the request frame, the process 600 may return to operation 614. In some embodiments, at operation 614, the assistance-seeking AP MLD may send a request to the next candidate AP MLD. This process may continue until an assisting AP MLD is found or until the assistance-seeking AP MLD has made a request with all the candidate AP MLDs.

In operation 626, upon determining that a response has been received, the assistance-seeking AP MLD may determine if the candidate AP MLD accepts the assistance-seeking request. In some embodiments, a response frame may include one or more of the information as shown in Table 800 as shown in FIG. 8.

In some embodiments, the candidate AP MLD may accept the assistance-seeking request using the "Response nature" information in the response. When the candidate AP MLD accepts the assistance-seeking request, the assistance-seeking AP MLD may then treat that particular (candidate) AP MLD as the assisting AP MLD for the designated period of time, e.g., as indicated in the "Assistance duration" information in the response.

In some embodiments, the candidate AP MLD may reject the assistance-seeking request using the "Reason code" information in the response. When the candidate AP MLD rejects the request made by the assistance-seeking AP MLD, the process 600 may return to operation 614. In some embodiments, at operation 614, the assistance-seeking AP MLD may send a request to the next candidate AP MLD. This process may continue until an assisting AP MLD is found or until the assistance-seeking AP MLD has made a request with all the candidate AP MLDs.

In some embodiments, when the request is rejected by all the candidate AP MLDs, the assistance-seeking AP MLD may start an EPCS priority access support termination procedure.

Figure 9:
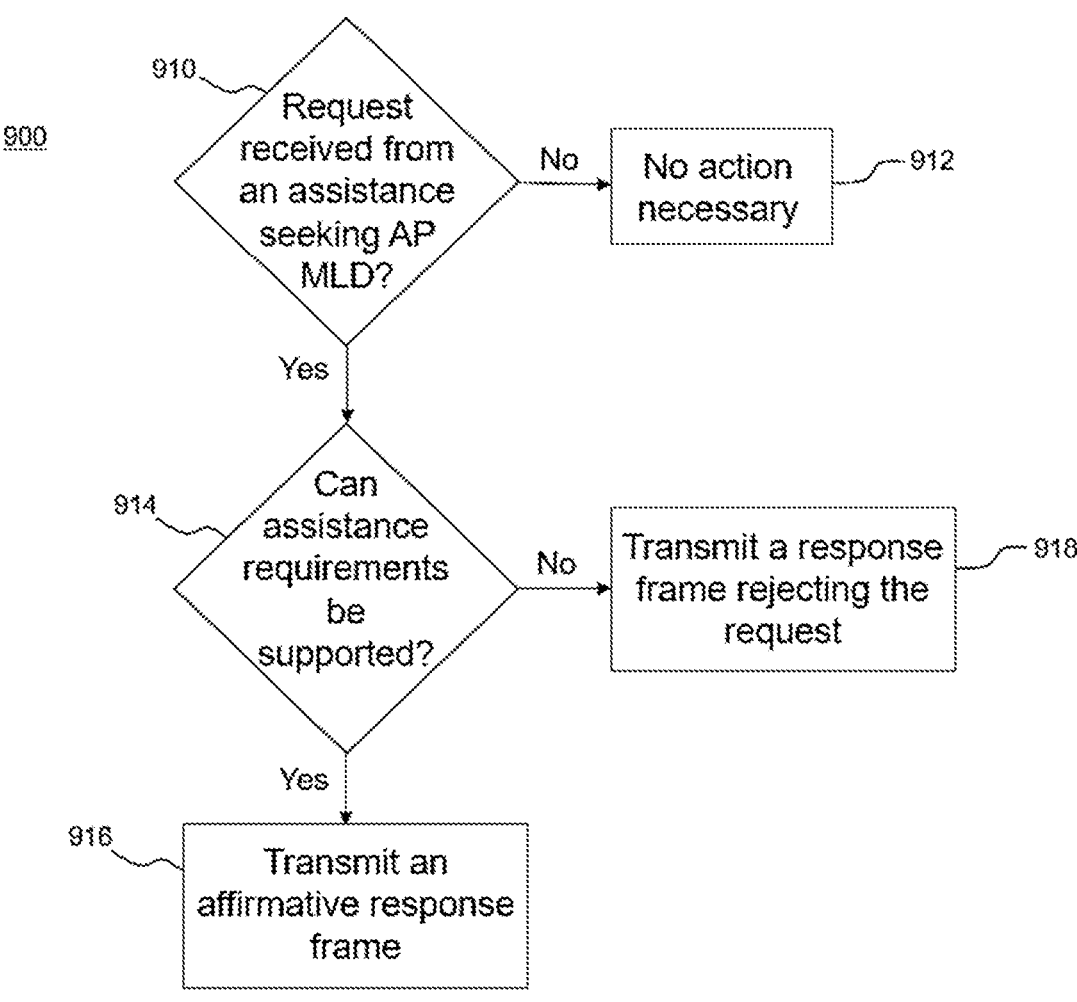
FIG. 9 shows an example of a process for handling of a request in accordance with an embodiment.

FIG. 9 shows an example of a wireless communication process 900 for handling of the request from an assistance-seeking AP MLD at the candidate AP MLD side, in accordance with some embodiments. This example may be applicable to IEEE 802.11be standard and any future amendments to IEEE 802.11 standard.

In some embodiments, at operation 910, when it is determined at a candidate AP MLD that an assistance-seeking request frame has been received from an assistance-seeking AP MLD (for example, transmitted by the assistance-seeking AP MLD as shown in operation 618 in FIG. 6), the process 900 may proceed to operation 914. When it is determined that no assistance-seeking request frame has been received, the process 900 may proceed to operation 912, where no further action is needed.

The information included in the request frame is shown in Table 700. At operation 914, when the candidate AP MLD is able to meet the requirements of assistance as requested by the assistance-seeking AP MLD, the candidate AP MLD may transmit (at operation 916) a response frame including one or more of the information as shown in Table 800. However, when the candidate AP MLD is not able to support the request parameters that are requested by the assistance-seeking AP MLD, the candidate AP MLD may reject the request in its response to the assistance-seeking AP MLD (at operation 918), for example, using the "Reason code" information in the response.

In some embodiments, when the request is rejected by all the candidate AP MLDs, the assistance-seeking AP MLD may start an EPCS priority access support termination procedure discussed below.

Figure 10:
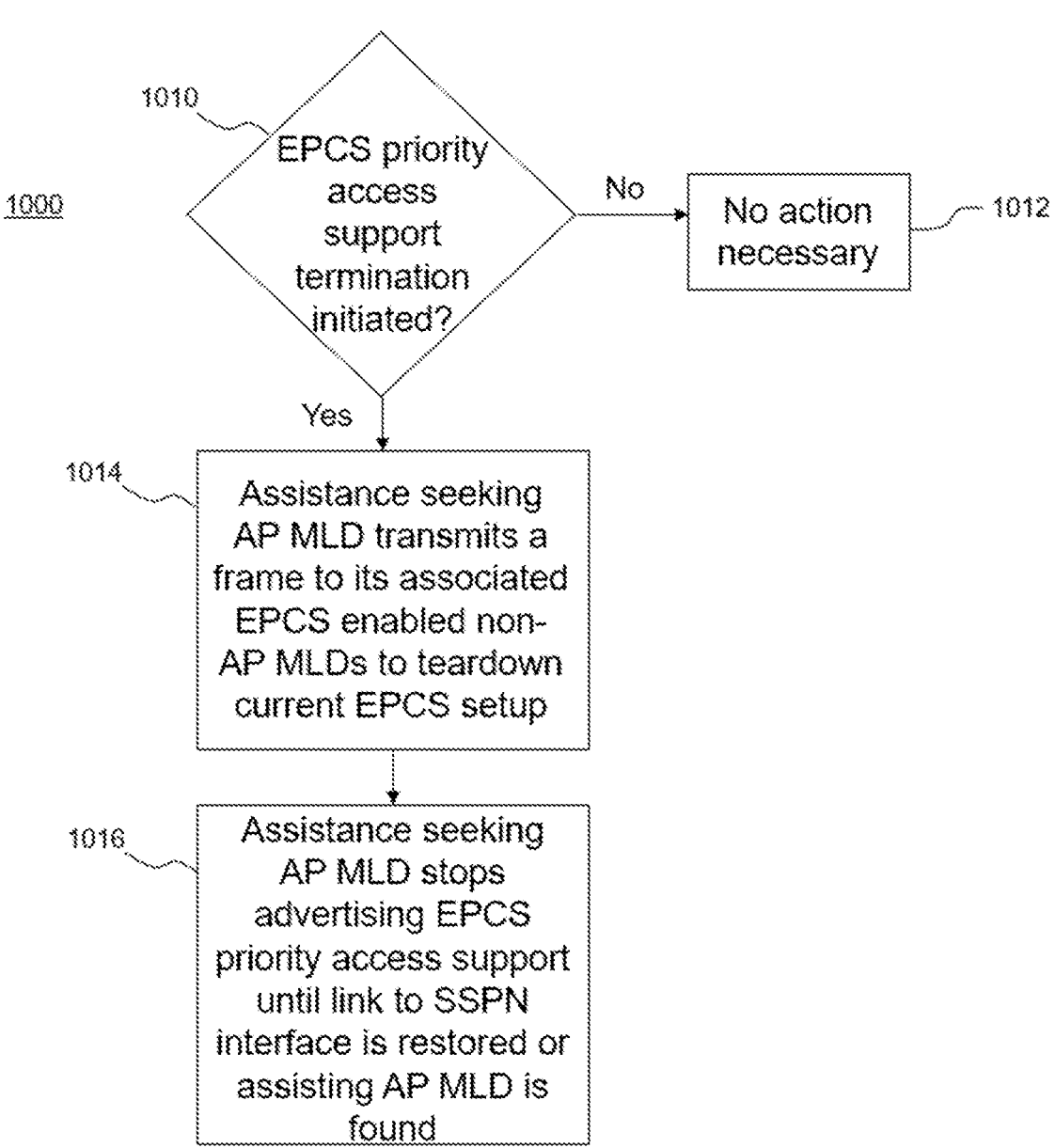
FIG. 10 shows an example of a process for EPCS priority access support termination in accordance with an embodiment.

FIG. 10 shows an example of a wireless communication process 1000 of EPCS priority access support termination procedure in accordance with some embodiments. This example may be applicable to IEEE 802.11be standard and any future amendments to IEEE 802.11 standard.

In some embodiments, in process 1000 the assistance-seeking AP MLD may transmit an EPCS priority access teardown frame to tear down the EPCS support that has been setup with the EPCS enabled non-AP MLD(s) associated with it. In some embodiments, the assistance-seeking AP MLD may stop advertising the support for EPCS priority access feature in management frames that it transmits (e.g., beacons, probe response frames, etc.).

In operation 1010, the assistance-seeking AP MLD may determine whether a priority access support termination procedure has been initiated. For example, requests for priority access support have been rejected by all the candidate AP MLDs. When the AP MLD determines that no priority access support termination procedure has been initiated, the process 1000 may proceed to operation 1012, where no further action is needed.

When the AP MLD determines that a priority access support termination procedure has been initiated, the process 1000 may proceed to operation 1014. In operation 1014, the assistance-seeking AP MLD may transmit an EPCS priority access teardown frame to its associated EPCS enabled non-AP MLDs to tear down the current EPCS setup. In operation 1016, the assistance-seeking AP MLD may stop advertising EPCS priority access support. The assistance-seeking AP MLD may resume advertising EPCS priority access support, for example, when its link to the SSPN is restored or an assisting AP MLD is found.

2. Search for and Switch to Alternative Candidates for Assisting AP MLD

In some embodiments, an assistance-seeking AP MLD may search for alternative candidates for assisting AP MLD. Searching for such alternative candidates may be useful, for example, when the assistance-seeking AP MLD wants to switch to a different candidate AP MLD that may provide better support (e.g., faster responses) without disrupting the communication of existing EPCS enabled non-AP MLD(s) associated with the assistance-seeking AP MLD. The search may also be made by the assistance-seeking AP MLD, for example, after the support with the assisting AP MLD is terminated (e.g., when the connection is lost with the assisting AP MLD). In some embodiments, the procedure for searching for alternative assisting AP MLD may be substantially the same as described in FIGS. 6-9, with the difference that for the information transmitted in the request frame as described in Table 700, the assisting AP MLD may explicitly indicate that the request is to search for a candidate assisting AP MLD by making an indication using the "Immediate support identifier" field described in Table 700.

In some embodiments, the assistance-seeking AP MLD may also rank the candidate assisting AP MLD(s). For example, the assistance-seeking AP MLD may rank the candidate assisting AP MLD(s) using one or more criteria. An example criterion may include time it takes to receive a response to the request frame sent to the candidate AP MLD. Other examples may include latency for transmission, achievable PHY throughput based on signal strength, and so on. Thus, when the assistance-seeking AP MLD wants to switch to a different AP MLD it may do so by selecting the candidate AP MLD with the highest ranking in the set.

3. Terminate the Current and Switch to a Different Assisting AP MLD

In some embodiments, after an assistance-seeking AP MLD has setup up EPCS support with an assisting AP MLD, the assistance-seeking AP MLD may terminate the EPCS support setup with the current AP MLD and/or switch to a different assisting AP MLD. For example, the assistance-seeking AP MLD may terminate the EPCS support setup when there are issues (e.g., delayed responses) with the current assisting AP MLD and an alternative candidate assisting AP MLD is available. In another example, the link with the SSPN interface may be restored and hence the support from the assisting AP MLD may be terminated as it is no longer needed.

Figure 11:
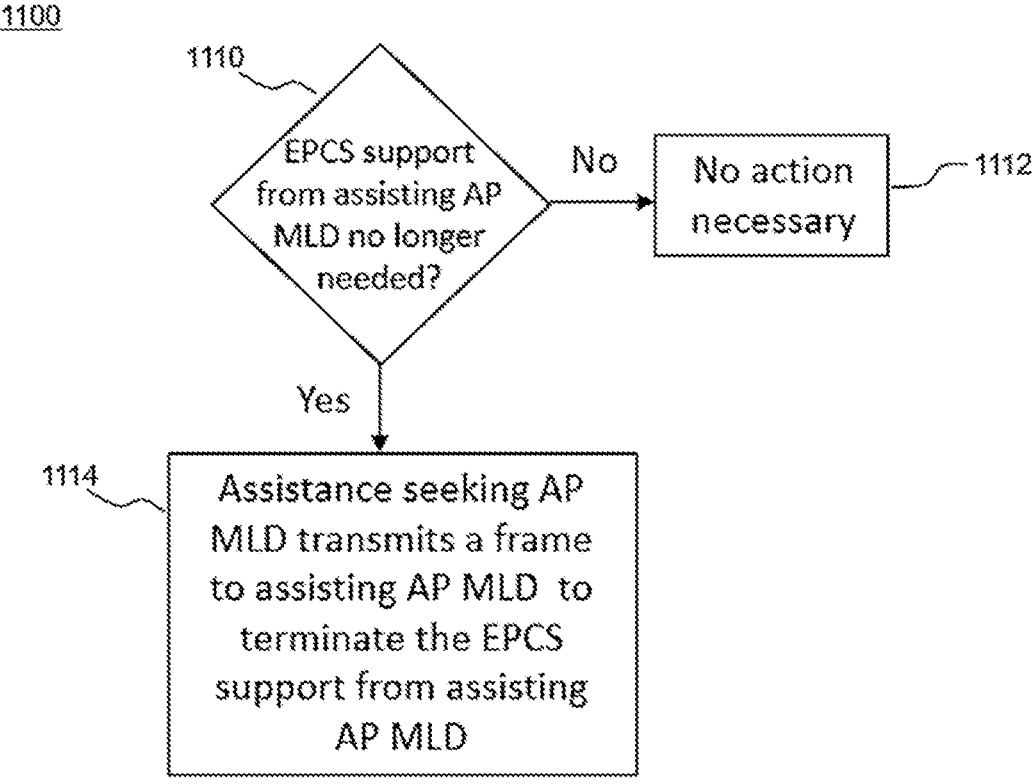
FIG. 11 shows another example of a process for EPCS priority access support termination in accordance with an embodiment.

FIG. 11 shows an example of a wireless communication process 1100 for terminating the EPCS support and switching from the current assisting AP MLD in accordance with some embodiments. This example may be applicable to IEEE 802.11be standard and any future amendments to IEEE 802.11 standard.

In operation 1110, the assistance-seeking AP MLD may determine if the EPCS support from the assisting AP MLD is no longer needed. When the assistance-seeking AP MLD determines that the EPCS support from the assisting AP MLD is still needed, the process 1110 may proceed to operation 1112, where no further action may be needed.

When the assistance-seeking AP MLD determines that the EPCS support from the assisting AP MLD is no longer needed, in operation 1114, the assistance-seeking AP MLD may transmit a frame to the assisting AP MLD. The frame may include one or more of the information fields described in Table 1200 shown in FIG. 12. In transmitting the frame, the assistance-seeking AP MLD may either request for a response from the current assisting AP MLD or consider the EPCS support terminated without any kind of response from the current assisting AP MLD. For example, the assistance-seeking AP MLD may use the "Response requested" field as described in Table 1200.

In some embodiments, the termination procedure may be performed either before or after an EPCS support setup has been completed with the next candidate assisting AP MLD.

In some embodiments, the setup with the next candidate assisting AP MLD may be set up by using the procedure described in FIG. 6 and the discussion in the above section titled Initial EPCS Support Setup Procedure to Determine an Assisting AP MLD. Completing the termination procedure after the next candidate assisting AP MLD has been determined (e.g., using the procedure discussed in the above section titled Search for and Switch to Alternative Candidates for Assisting AP MLD) and finalized (e.g., using the procedure discussed in the above section titled Initial EPCS Support Setup Procedure to Determine an Assisting AP MLD) may help the assistance-seeking AP MLD to provide EPCS priority access service support to its associated EPCS enabled/capable non-AP MLD(s) without any kind of disruptions to the current EPCS support.

In some embodiments, the assistance-seeking AP MLD may request a response, e.g., using the "Response requested" field as described in Table 1200. In these embodiments, the current assisting AP MLD may transmit a response frame. The response frame may include one or more of the information fields shown in Table 1300 in FIG. 13.

In some embodiments, the assistance-seeking AP MLD may seek assistance from only one assisting AP MLD at a time. In some embodiments, the assistance-seeking AP MLD may seek assistance from multiple AP MLDs for providing EPCS support. In such a case, when one assisting AP MLD is unresponsive for a period of time, the assistance-seeking AP MLD may switch to the next assisting AP MLD without terminating the EPCS support setup. This may save termination and re-setup overhead in case the unresponsive assisting AP MLD starts to respond again and may be used for EPCS support.

B. EPCS Support for Authorization

1. Initial Authorization Support

Figure 14:
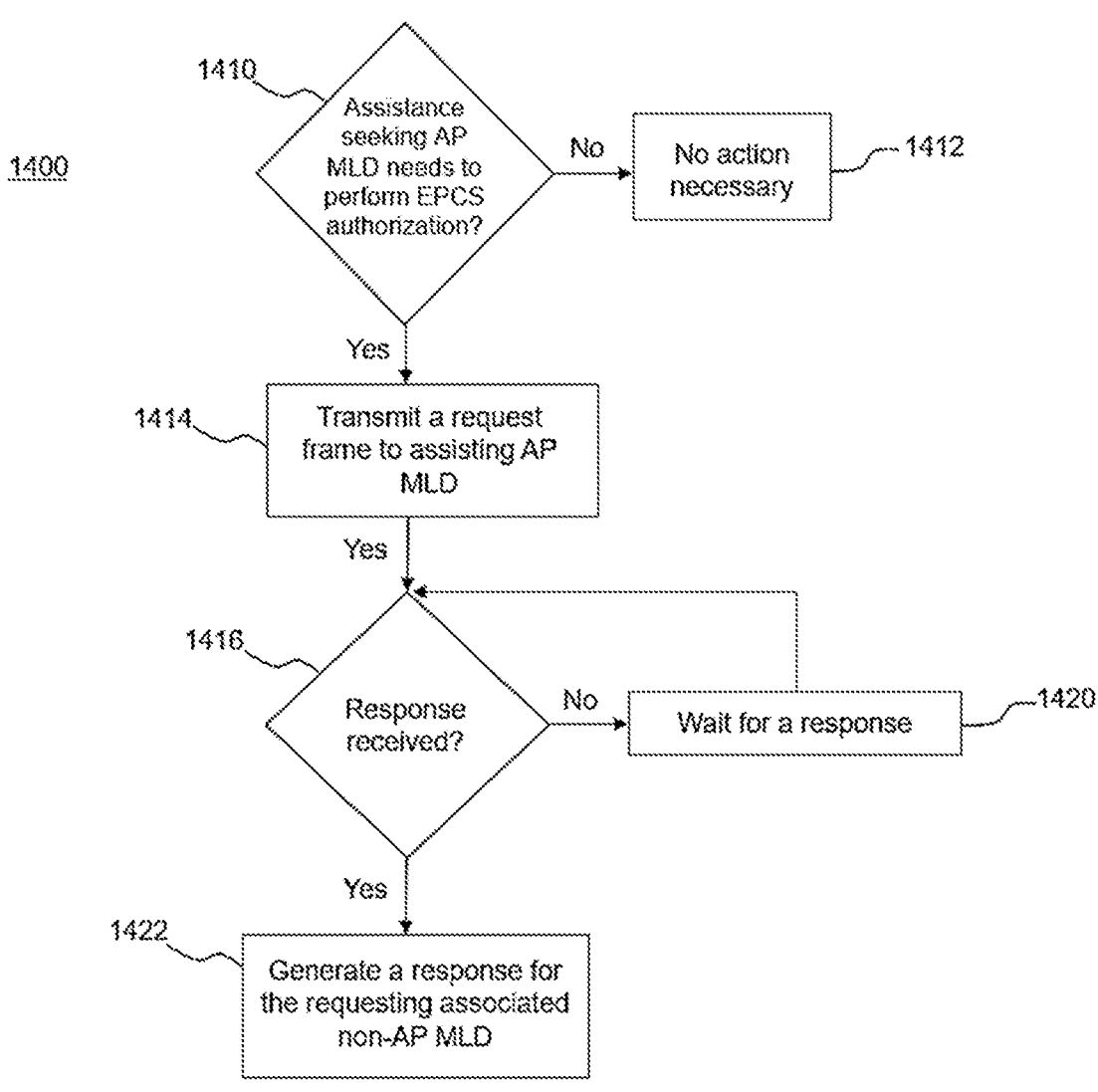
FIG. 14 shows an example of a process for EPCS authorization in accordance with an embodiment.

FIG. 14 shows an example of a wireless communication process 1400 for an assistance-seeking AP MLD to request assistance in performing EPCS authorization for an EPCS capable non-AP in accordance with some embodiments. This example may be applicable to IEEE 802.11be standard and any future amendments to IEEE 802.11 standard.

In operation 1410, the assistance-seeking AP MLD may determine whether to perform EPCS authorization. For example, the AP MLD may receive a request to authorize an associated non-AP MLD for EPCS priority access. When the assistance-seeking AP MLD determines that there is no need to perform EPCS authorization, the process 1400 may proceed to operation 1420, where no further action is needed.

When the assistance-seeking AP MLD determines to perform EPCS authorization, in operation 1014, the assistance-seeking AP MLD may transmit a frame to the assisting AP MLD. The frame may include one or more of the information fields shown in Table 1500 in FIG. 15.

In operation 1416, after transmitting the frame to the assisting AP MLD, the assistance-seeking AP MLD may wait (at operation 1420) for a response from the assisting AP MLD. In some embodiments (not shown in FIG. 14), if a response is not received from the assisting AP MLD, for example after a predetermined time, the assistance-seeking AP MLD may make another attempt at a later point in time to transmit another frame to the assisting AP MLD. In some embodiments, if the assistance-seeking AP MLD is leveraging help from multiple assisting AP MLD(s), it may send the request to another assisting AP MLD and seek a response.

In operation 1422, when a response from the assisting AP MLD is received, the assistance-seeking AP MLD may generate communication (e.g., its own response), for example, to a requesting associated non-AP MLD.

Figure 16:
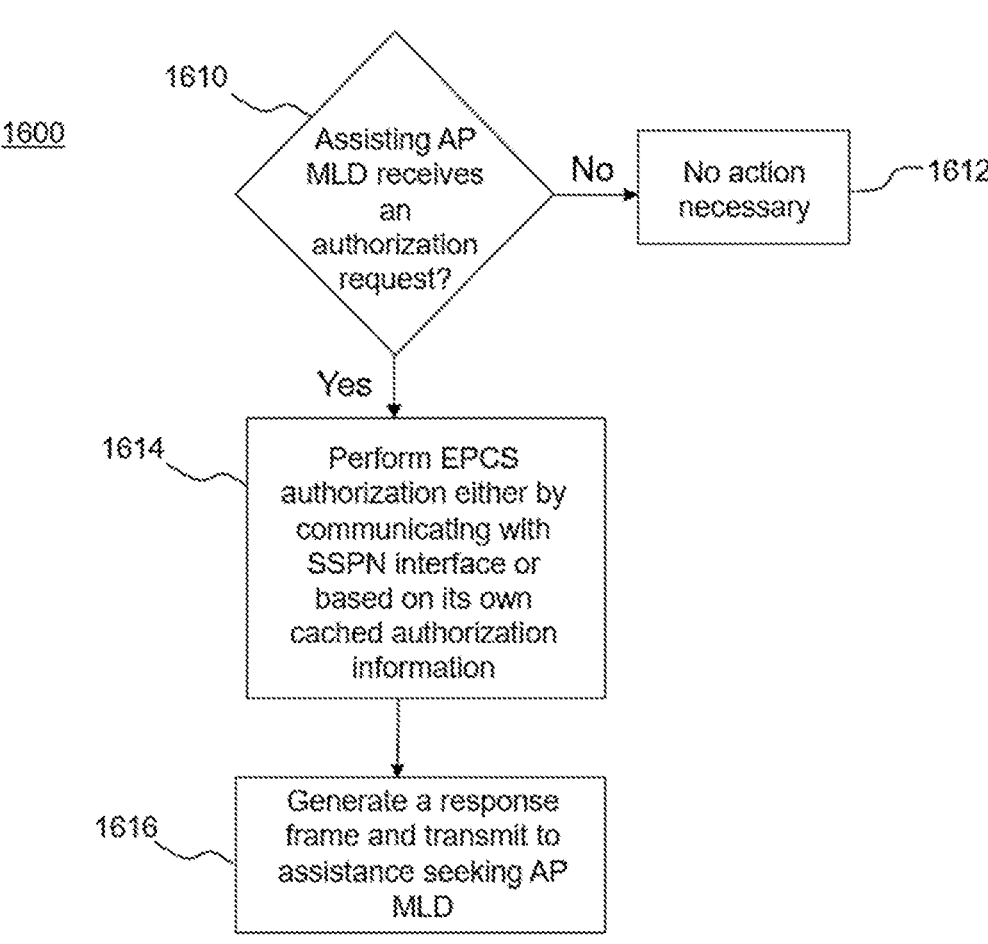
FIG. 16 shows an example of a process for EPCS support for EPCS authorization in accordance with an embodiment.

FIG. 16 shows an example of a wireless communication process 1600 for processing a request by an assisting AP MLD in accordance with some embodiments. This example may be applicable to IEEE 802.11be standard and any future amendments to IEEE 802.11 standard.

In operation 1610, the assisting AP MLD may determine whether a request for EPCS support for EPCS authorization is received from an assistance-seeking AP MLD. When the assisting AP MLD determines that there is no request received, the process 1600 may proceed to operation 1612, where no further action is needed.

In some embodiments, in operation 1610, upon receiving a request for EPCS support for EPCS authorization from an assistance-seeking AP MLD, the assisting AP MLD may process the request (in operation 1614) and determine the EPCS authorization for the set of non-AP MLD(s) indicated in the request frame sent by the assistance-seeking AP MLD. In some embodiments, to process the request, the assisting AP MLD may make use of cached EPCS authorization information. In some embodiments, the assisting AP MLD may communicate with the SSPN interface to determine the EPCS authorization for the set of non-AP MLD(s) indicated in the request frame sent by the assistance-seeking AP MLD. In operation 1616, upon completing the authorization process in operation 1614, the assisting AP MLD may transmit a response frame to the assistance-seeking AP MLD. The response frame may include one or more of the information fields shown in Table 1700 in FIG. 17.

2. Runtime EPCS Update Support

In some embodiments, an assisting AP MLD may forward messages received from the SSPN interface to the assistance-seeking AP MLD. For example, the assisting AP MLD may forward any unsolicited authorization and/or authorization revoke messages received from the SSPN interface to the assistance-seeking AP MLD.

When the EPCS authorization of a non-AP MLD(s) is found to be revoked by the SSPN interface, the assisting AP MLD may transmit an unsolicited frame to the assistance-seeking AP MLD. The frame may include one or more of the information fields as shown in Table 1800 in FIG. 18. Upon receiving the frame from the assisting AP MLD, the assistance-seeking AP MLD may transmit a frame to the non-AP MLD(s) whose authorization information has been updated to inform the non-AP MLD(s) regarding the update.

In some embodiments, an assisting AP MLD may perform a periodic check on non-AP MLD(s), e.g., the non-AP MLD(s) that the assisting AP MLD has performed authorization for. For example, the assisting AP MLD may perform a periodic check to verify the status for the non-AP MLD(s) that the assisting AP MLD has performed authorization for, e.g., to verify whether the status is still valid.

3. EPCS Support for Operation Parameter Determination

In some embodiments, the assistance-seeking AP MLD may seek assistance for updates from the assisting AP MLD. For example, the assistance-seeking AP MLD may seek assistance for determining and/or making updates to EPCS operation parameters from the assisting AP MLD. In some embodiments, the assistance-seeking AP MLD may transmit a frame to the assisting AP MLD to seek update on operation parameters. The frame may include one or more of the information fields shown in Table 1900 in FIG. 19. Upon receiving such a frame from the assistance-seeking AP MLD, the assisting AP MLD may transmit a response frame to the assistance-seeking AP MLD. The response frame may include one or more of the information fields as shown in Table 2000 in FIG. 20.

4. EPCS Service Termination Handling

In some embodiments, the assistance-seeking AP MLD may communicate with the assisting AP MLD regarding EPCS authorization termination. For example, when the EPCS authorization is terminated for a non-AP MLD by the assistance-seeking AP MLD (e.g., due to a termination request from the non-AP MLD), the assistance-seeking AP MLD may transmit a frame including the corresponding EPCS authorization termination information to the assisting AP MLD. The frame may include one or more of the information fields as shown in Table 2100 in FIG. 21. Upon receiving the frame from the assistance-seeking AP MLD, the assisting AP MLD may update the EPCS enabled state for the given EPCS device(s). In some embodiments, the assisting AP MLD may stop performing the procedures described in the above section titled Runtime EPCS Update Support for such device(s).

5. EPCS Assistance Support Capability Advertisement

In some embodiments, an AP MLD may advertise its EPCS support feature. For example, when an AP MLD has the EPCS support feature implemented and may thus serve as an assisting AP MLD for an assistance-seeking AP MLD, that particular AP MLD may advertise the feature to inform potential assistance-seeking AP MLD(s). In some embodiments, the advertisement may be done via management frames (e.g., beacon frames) that the AP MLD transmits. Assistance-seeking AP MLD may determine the candidate assisting AP MLD set based on information received via such management frames. The advertisement may include at least one or more of the information fields as shown in Table 2200 in FIG. 22. The information fields in Table 2200 may be included in any of the management frames in the IEEE 802.11standard. For example, they may be included in an element which may be advertised in beacon frames.

As used herein, a reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term "include," "have," or the like is used, such term is intended to be inclusive in a manner similar to the term "comprise" as "comprise" is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

As used herein, the term "couple" and its derivatives refer to any direct or indirect communication between two or more elements, whether or not those elements are in physical contact with one another. The terms "transmit," "receive," and "communicate," as well as derivatives thereof, may encompass both direct and indirect communication. The terms "include" and "comprise," as well as derivatives thereof, mean inclusion without limitation. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely.

Various functions described herein may be implemented or supported by one or more computer programs, each of which may be formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" may include any type of computer code, including source code, object code, and executable code. The phrase "computer readable medium" may include any type of medium capable of being accessed by a computer, such as read only memory (ROM), random access memory (RAM), a hard disk drive, a compact disc (CD), a digital video disc (DVD), or any other type of memory. A non-transitory computer readable medium may include media where data can be permanently stored and media where data can be stored and later overwritten, such as a rewritable optical disc or an erasable memory device.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An access point (AP) multi-link device (MLD) in a wireless network, the AP MLD comprising:
  one or more APs; and
  a processor coupled to the one or more APs, the processor configured to:
    determine a need for assistance for support for emergency communication priority access service;
    based on the determination that the assistance for support for emergency communication priority access service is needed, determine that at least one external AP device is available to provide the assistance for support of emergency communication priority access service;
    transmit a request frame to the at least one external AP device to request assistance for support for emergency communication priority access services;

receive a response from the at least one external AP device;
    based on the response from the at least one external AP device, provide, with the assistance from the at least one external AP device, support of emergency communication priority access service to a non-AP device associated with the AP MLD; and
    transmit a request frame to the at least one external AP device to terminate assistance for support for emergency communication priority access service for the non-AP device associated with the AP MLD.

2. The AP MLD of claim 1, wherein the processor is configured to receive an advertisement from the at least one external AP device advertising a capability to provide support for emergency communication priority access service.

3. The AP MLD of claim 1, wherein the processor is configured to:
  determine that a plurality of external AP devices are available to provide the assistance for support of emergency communication priority access service; and
  transmit the request frame to each of the plurality of external AP devices.

4. The AP MLD of claim 3, wherein the processor is configured to transmit the request frame to each of the plurality of external AP devices sequentially.

5. The AP MLD of claim 3, wherein the processor is configured to:
  receive two or more response frames from two or more external AP devices from the plurality of external AP devices; and
  rank the one or more external AP devices based on one or more predetermined criteria.

6. The AP MLD of claim 5, wherein the processor is configured to:
  select from the two or more external AP devices an external AP device having the highest rank; and
  based on the response from the external AP device having the highest rank, provide, with the assistance from the external AP device having the highest rank, support of emergency communication priority access service to the non-AP device associated with the AP device.

7. An access point (AP) multi-link device (MLD) in a wireless network, the AP MLD comprising:
  one or more APs; and
  a processor coupled to the one or more APs, the processor configured to:
    determine a need for assistance for support for emergency communication priority access service;
    based on the determination that the assistance for support for emergency communication priority access service is needed, determine that at least one external AP device is available to provide the assistance for support of emergency communication priority access service;
    transmit a request frame to the at least one external AP device to request assistance in performing emergency communication priority access service authorization for a non-AP device associated with the AP MLD for support for emergency communication priority access services;
    receive a response from the at least one external AP device; and
    based on the response from the at least one external AP device, provide, with the assistance from the at least one external AP device, support of emergency communication priority access service to a non-AP device associated with the AP MLD.

8. The AP MLD of claim 7, wherein the processor is configured to:

wait for a response from the at least one external AP device; and after a pre-determined time and not receiving the response from the at least one external AP device, the processor is configured to transmit another request frame to the at least one external AP device to request assistance in performing emergency communication priority access service authorization.

9. The AP MLD of claim 1, wherein the processor is configured to receive unsolicited messages from a subscription service provider network (SSPN) interface via the at least one external AP device.

10. The AP MLD of claim 1, wherein the request frame includes an information indicating request for immediate support for emergency communication priority access service.

11. The AP MLD of claim 1, wherein the request frame includes an information indicating request for future support for emergency communication priority access service.

12. An access point (AP) multi-link device (MLD) in a wireless network and coupled to a subscription service provider network (SSPN) interface, the AP MLD comprising:

one or more APs; and a processor coupled to the one or more APs, the processor configured to:

advertise a capability to provide support for emergency communication priority access service;

receive a request frame from an external AP device requesting assistance for support for emergency communication priority access service for the external AP device;

determine to accept to provide support for emergency communication priority access service for the external AP device;

generate a response to accept to provide support for emergency communication priority access service for the external AP device;

transmit the response to the external AP device; and receive a request frame from the external AP device requesting termination of assistance for support for emergency communication priority access service for a non-AP device associated with the external AP device.

13. The AP MLD of claim 12, wherein the processor is configured to determine to accept to provide support for emergency communication priority access service for the external AP device based on information included in the request frame.

14. The AP MLD of claim 12, wherein the processor is configured to receive a request frame from the external AP device requesting assistance in performing emergency communication priority access service authorization for a non-AP device associated with the external AP device.

15. The AP MLD of claim 12, wherein the processor is configured to:

receive one or more unsolicited messages from the SSPN interface; and transmit the one or more unsolicited messages to the external AP device.

16. The AP MLD of claim 12, wherein the response includes an information field indicating an assistance duration.

17. The AP MLD of claim 12, wherein the AP MLD is a mobile device.

18. The AP MLD of claim 12, wherein the processor is configured to:

receive a request frame from a second external AP device requesting assistance for support for emergency communication priority access service;

determine to accept to provide support for emergency communication priority access service for the second external AP device;

generate a response to accept to provide support for emergency communication priority access service for the second external AP device; and transmit the response to the second external AP device.

19. The AP MLD of claim 7, wherein the processor is configured to receive unsolicited messages from a subscription service provider network (SSPN) interface via the at least one external AP device.

20. The AP MLD of claim 7, wherein the processor is configured to transmit a request frame to the at least one external AP device to terminate assistance for support for emergency communication priority access service for the non-AP device associated with the AP MLD.

* * * * *